(12) United States Patent
Muramatsu et al.

(10) Patent No.: US 11,912,256 B2
(45) Date of Patent: Feb. 27, 2024

(54) CONTROL APPARATUS FOR VEHICLE AND CONTROL PROGRAM FOR VEHICLE

(71) Applicant: ADVICS CO., LTD., Kariya (JP)

(72) Inventors: Sotaro Muramatsu, Tokyo (JP); Yosuke Hashimoto, Tokyo (JP)

(73) Assignee: ADVICS CO., LTD., Kariya (JP)

( * ) Notice: Subject to any disclaimer, the term of this patent is extended or adjusted under 35 U.S.C. 154(b) by 14 days.

(21) Appl. No.: 17/455,771

(22) Filed: Nov. 19, 2021

(65) Prior Publication Data
US 2022/0169215 A1 Jun. 2, 2022

(30) Foreign Application Priority Data

Nov. 27, 2020 (JP) ................................ 2020-196935

(51) Int. Cl.
| | |
|---|---|
| *B60T 8/172* | (2006.01) |
| *B60T 8/24* | (2006.01) |
| *B60T 8/171* | (2006.01) |
| *B60T 8/26* | (2006.01) |

(52) U.S. Cl.
CPC .............. *B60T 8/172* (2013.01); *B60T 8/171* (2013.01); *B60T 8/246* (2013.01); *B60T 8/26* (2013.01)

(58) Field of Classification Search
CPC .......... B60T 8/172; B60T 8/171; B60T 8/246; B60T 8/26
See application file for complete search history.

(56) References Cited

U.S. PATENT DOCUMENTS

| | | | | | |
|---|---|---|---|---|---|
| 3,377,108 | A | * | 4/1968 | Eddy ......................... | B60T 8/26 188/152 |
| 5,470,134 | A | * | 11/1995 | Toepfer ................. | B60T 8/1764 303/9.69 |
| 2010/0174463 | A1 | * | 7/2010 | Uragami .............. | B60W 40/112 701/70 |

FOREIGN PATENT DOCUMENTS

| | | | |
|---|---|---|---|
| JP | 2019077221 A | 5/2019 | |
| JP | 7060356 B2 * | 4/2022 | .............. B60T 13/74 |

OTHER PUBLICATIONS

Machine Translation of JP7060356B2 (Year: 2017).*

* cited by examiner

*Primary Examiner* — Faris S Almatrahi
*Assistant Examiner* — Andrew J Cromer
(74) *Attorney, Agent, or Firm* — BUCHANAN INGERSOLL & ROONEY PC

(57) ABSTRACT

To suppress a sharp variation in the posture of a vehicle in a control apparatus that is configured to control the posture of the vehicle by adjusting a distribution ratio of a braking force between the front and rear during braking of the vehicle.
The control apparatus includes a distribution setting unit that is configured to change the braking force distribution ratio from a basic braking force ratio during braking of the vehicle so that a posture of the vehicle follows a posture indicated by the target posture value. If the target posture value is varied when the braking force distribution ratio is different from the basic braking force ratio, the distribution setting unit sets the amount of change, by which the braking force distribution ratio is changed per unit time, equal to or smaller than a restriction amount.

4 Claims, 7 Drawing Sheets

US 11,912,256 B2

CONTROL APPARATUS FOR VEHICLE AND CONTROL PROGRAM FOR VEHICLE

TECHNICAL FIELD

The present disclosure relates to a control apparatus for a vehicle and a control program for a vehicle that control a posture of a vehicle during traveling.

BACKGROUND ART

PTL 1 discloses a control apparatus for adjusting a distribution ratio of a braking force between the front and rear (front-rear distribution ratio) so that a pitch angle of a vehicle becomes closer to a target pitch angle. The front-rear distribution ratio indicates a ratio for distributing the braking force of the vehicle between a braking force to be applied on front wheels and a braking force to be applied on rear wheels.

CITATION LIST

Patent Literature

PTL 1: JP-A-2019-77221

SUMMARY

In the vehicle, an anti-dive force being a force to displace a vehicle front part upward is generated when a braking force is applied on the front wheels. Meanwhile, in the vehicle, a rear wheel anti-lift force being a force to displace a vehicle rear part downward is generated when a braking force is applied on the rear wheels. The magnitude of the anti-dive force relative to the magnitude of the braking force is set by the vehicle's suspension geometry. Likewise, the magnitude of the rear wheel anti-lift force relative to the magnitude of the braking force is set by the vehicle's suspension geometry. For this reason, if the front-rear distribution ratio of a braking force is changed, the ratio between the magnitude of the anti-dive force and the magnitude of the rear wheel anti-lift force is also changed. In response to the change in the ratio between the magnitude of the anti-dive force and the magnitude of the rear wheel anti-lift force, the vehicle's pitching moment is varied. In other words, the vehicle's pitching moment is varied and its pitch angular velocity is changed according to the change in the front-rear distribution ratio of a braking force.

In the control apparatus disclosed in PTL 1, if the target pitch angle is varied during braking, the front-rear distribution ratio is adjusted in order to make the pitch angle closer to the varied target pitch angle. For this reason, if there is a large amount of variation in the target pitch angle during braking, the pitch angular velocity might be increased by the adjustment of the front-rear distribution ratio. In other words, the posture of the vehicle during braking might be varied drastically by the adjustment of the front-rear distribution ratio. If the posture of the vehicle is changed drastically, it might make an occupant of the vehicle feel a sense of discomfort.

Solution to Problem

A control apparatus for a vehicle for solving the above problem is employed in a vehicle capable of adjusting a braking force distribution ratio which is a ratio for distributing a braking force to be applied on wheels at the time of braking the vehicle between a braking force to be applied on front wheels and a braking force to be applied on rear wheels. The control apparatus is characterized by including: a calculator that is configured to calculate, as a target posture value, a value indicating a target posture of the vehicle; and a distribution setting unit that is configured to change the braking force distribution ratio from a basic braking force ratio during braking of the vehicle so that a posture of the vehicle follows a posture indicated by the target posture value, the basic braking force ratio being a value of the braking force distribution ratio obtained when no control for adjusting the braking force distribution ratio is performed, and characterized in that, if the target posture value is varied when the braking force distribution ratio is different from the basic braking force ratio, the distribution setting unit sets the amount of change, by which the braking force distribution ratio is changed per unit time, equal to or smaller than a restriction amount.

According to the above configuration, the amount of change in the braking force distribution ratio is restricted if the braking force distribution ratio is different from the basic braking force ratio. Thereby, a pitch angular velocity due to a change in the braking force distribution ratio becomes smaller. In other words, a sharp change in the pitch angle of the vehicle can be suppressed. By suppressing a sharp change in the pitch angle, it is possible to reduce a sense of discomfort which might otherwise be felt by an occupant of the vehicle.

DESCRIPTION OF EMBODIMENTS

First Embodiment

A control apparatus for a vehicle according to a first embodiment is described with reference to FIGS. 1 to 4.

Figure 1:
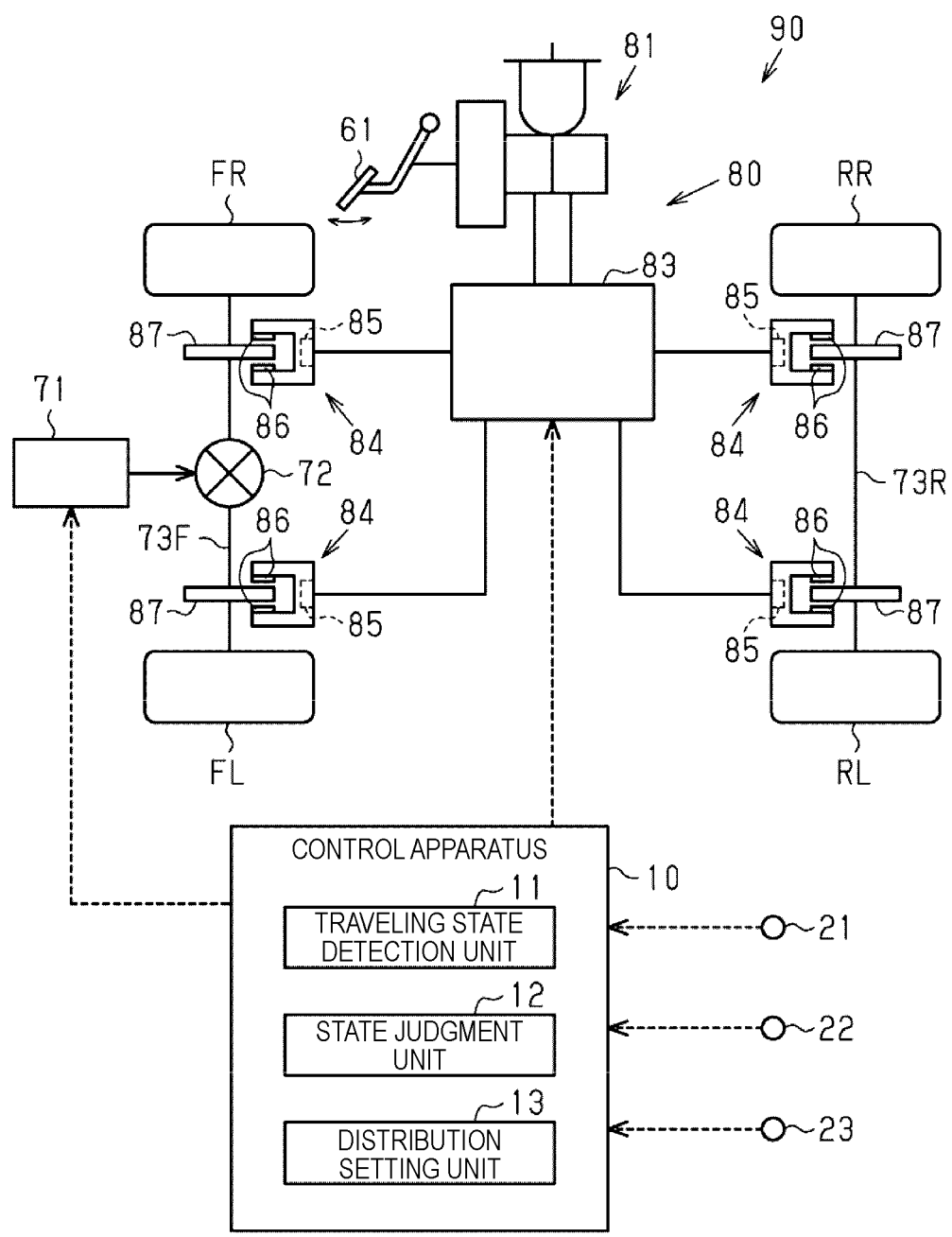
FIG. 1 is a schematic diagram illustrating: a control apparatus for a vehicle according to a first embodiment; and a vehicle to be controlled by the control apparatus.

FIG. 1 illustrates a vehicle 90 equipped with a driving apparatus 71. The driving apparatus 71 includes a power source. An example of the power source included in the driving apparatus 71 is an internal combustion engine. The power source included in the driving apparatus 71 may be a motor generator. The driving apparatus 17 includes a power transmission mechanism that is configured to transmit a driving force which is output due to the driving of the power source. The power transmission mechanism may include a transmission.

The vehicle 90 includes four wheels. As front wheels, the vehicle 90 includes: a left front wheel FL; and a right front wheel FR. The vehicle 90 includes a front wheel axle 73F on which the left front wheel FL and the right front wheel FR are mounted. As rear wheels, the vehicle 90 includes: a left rear wheel RL; and a right rear wheel RR. The vehicle 90 includes a rear wheel axle 73R on which the left rear wheel RL and the right rear wheel RR are mounted.

The vehicle 90 includes a suspension device that suspends the wheels. The vehicle 90 includes a suspension device for the front wheels FL, FR that is mounted on the left front wheel FL and the right front wheel FR. The vehicle 90 includes a suspension device for the rear wheels RL, RR that is mounted on the left rear wheel RL and the right rear wheel RR.

The vehicle 90 is a front-wheel drive vehicle. The vehicle 90 includes a differential gear 72 that is configured to transmit a driving force to the front wheel axle 73F. In other words, the driving force is transmitted to the front wheels FL, FR via the differential gear 72 and the front wheel axle 73F.

The vehicle 90 includes a braking manipulation member 61. The braking manipulation member 61 is mounted on a position where a driver of the vehicle can manipulate it. The braking manipulation member 61 is a brake pedal, for example.

The vehicle 90 includes a braking apparatus 80 that is configured to apply a braking force to the wheels. The braking apparatus 80 includes braking mechanisms 84 that correspond to the respective wheels. Each braking mechanism 84 is constituted of: a rotary body 87 that is designed to rotate together with the wheel; a friction member 86; and a wheel cylinder 85. In the braking mechanism 84, the friction member 86 is pressed against the rotary body 87 according to hydraulic pressure inside the wheel cylinder 85. The braking mechanism 84 can increase a braking force to be applied on the wheel as the friction member 86 is pressed against the rotary body 87 by a greater force.

The braking apparatus 80 includes: a hydraulic pressure generator 81; and a braking actuator 83. The braking apparatus 80 can supply hydraulic pressure, having been generated in the hydraulic pressure generator 81, to the wheel cylinders 85 via the braking actuator 83.

When the driver manipulates the braking manipulation member 61, the hydraulic pressure generator 81 can generate hydraulic pressure according to the amount of manipulation at this time. When the driver manipulates the braking manipulation member 61, brake fluid, the amount of which corresponds to hydraulic pressure generated by the hydraulic pressure generator 81, is supplied to the wheel cylinders 85 via the braking actuator 83.

The braking actuator 83 can adjust hydraulic pressure to be supplied to each wheel cylinder 85 on a per wheel cylinder basis. In other words, the braking apparatus 80 can adjust a braking force to be applied on each wheel on a per wheel basis.

Figure 2:
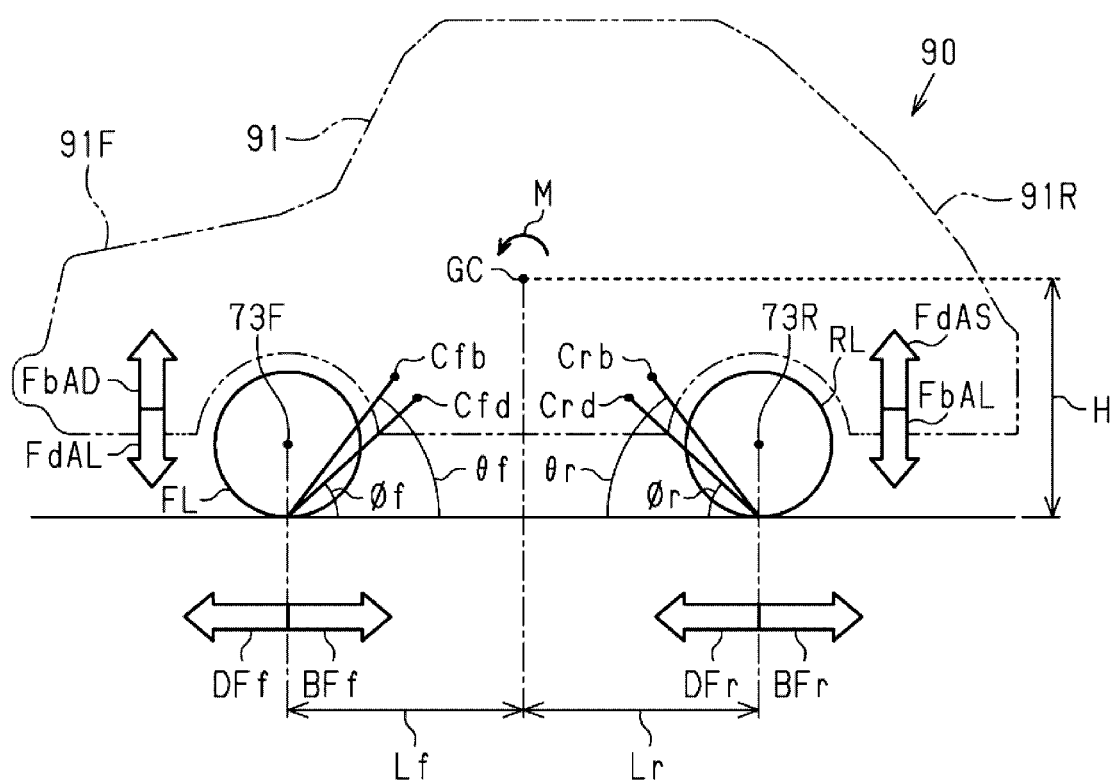
FIG. 2 is a schematic diagram explaining: forces to act on the vehicle due to a braking force; and forces to act on the vehicle due to a driving force.

FIG. 2 illustrates the vehicle 90 as seen from the side. Out of the wheels, FIG. 2 illustrates the left front wheel FL and the left rear wheel RL. FIG. 2 shows a vehicle gravity center GC of the vehicle 90. FIG. 2 shows a gravity center height H which is the distance from the vehicle gravity center GC to the road surface. FIG. 2 shows, as a first distance Lf, the horizontal distance between the vehicle gravity center GC and the front wheel axle 73F in the longitudinal direction of the vehicle 90. FIG. 2 shows, as a second distance Lr, the horizontal distance between the vehicle gravity center GC and the rear wheel axle 73R in the longitudinal direction of the vehicle 90. The sum of the first distance Lf and the second distance Lr corresponds to the wheelbase of the vehicle 90.

FIG. 2 shows an arrow exemplifying a pitching moment M which is generated around the vehicle gravity center GC during braking of the vehicle 90. The pitching moment M can be calculated based on: an inertia force that acts on the vehicle gravity center GC; the gravity center height H of the vehicle 90; and the first and second distances Lf, Lr. During braking of the vehicle 90, a forward inertia force acts on the vehicle gravity center GC. For this reason, the pitching moment M is a force to displace downward a vehicle body front part 91F which is a portion of a vehicle body 91 on the front wheels FL, FR side. The pitching moment M is also a force to displace upward a vehicle body rear part 91R which is a portion of the vehicle body 91 on the rear wheels RL, RR side. To put it differently, the pitching moment M is a force to tilt the vehicle body 91 forward.

How much the vehicle 90 is tilted forward is represented as a pitch angle $\theta y$. The pitch angle $\theta y$ takes a larger value as the vehicle front part is located further downward than the case in which the vehicle 90 is in a horizontal position. In other words, as the pitch angle $\theta y$ increases, it indicates that the vehicle 90 is in a posture tilted further forward. As the pitch angle $\theta y$ takes a value closer to "0", it indicates that the vehicle is tilted less forward. To put it another way, as the pitch angle $\theta y$ takes a value closer to "0", it indicates that the vehicle 90 is in a posture closer to a horizontal posture.

In the following description with reference to FIG. 2, while a description for the left front wheel FL is provided, a description for the right front wheel FR symmetrical to the left front wheel FL is sometimes omitted. Likewise, while a description for the left rear wheel RL is provided, a description for the right rear wheel RR symmetrical to the left rear wheel RL is sometimes omitted.

A description is provided for a braking force and a driving force to act on each of the wheels of the vehicle 90. In FIG. 2, a braking force to act on each of the front wheels FL, FR is represented as a front wheel braking force BFf, and a driving force to act on each of the front wheels FL, FR is represented as a front wheel driving force DFf. In FIG. 2, a braking force to act on each of the rear wheels RL, RR is represented as a rear wheel braking force BFr, and a driving force to act on each of the rear wheels RL, RR is represented as a rear wheel driving force DFr. The sum of the front wheel braking force BFf and the rear wheel braking force BFr is referred to as a total braking force of the vehicle 90. The sum of the front wheel driving force DFf and the rear wheel driving force DFr is referred to as a total driving force of the vehicle 90.

FIG. 2 shows an instant center of rotation of each wheel. An instant center of rotation of each of the front wheels FL, FR during braking is represented as a first center of rotation Cfb. An angle of a straight line, which connects the point where the front wheel FL is in contact with the road surface and the first center of rotation Cfb, with respect to the road surface is represented as a first angle $\theta f$. An instant center of rotation of the front wheel FL during driving is represented as a second center of rotation Cfd. An angle of a straight line, which connects the point where the front wheel FL is in contact with the road surface and the second center of rotation Cfd, with respect to the road surface is represented as a second angle $\theta f$. Meanwhile, an instant center of rotation of the rear wheel RL during braking is represented as a third center of rotation Crb. An angle of a straight line, which connects the point where the rear wheel RL is in contact with the road surface and the third center of rotation Crb, with respect to the road surface is represented as a third angle θr. An instant center of rotation of the rear wheel RL during driving is represented as a fourth center of rotation Crd. An angle of a straight line, which connects the point where the rear wheel RL is in contact with the road surface and the fourth center of rotation Crd, with respect to the road surface is represented as a fourth angle Φr.

Note that, the position of each instant center of rotation is determined depending on the feature of the suspension device. The position of each instant center of rotation illustrated in FIG. 2 is merely one example and does not represent the actual position of each instant center of rotation. Thus, the size of each of the first angle θf, the second angle Φf, the third angle θr, and the fourth angle Φr also does not represent the actual angle size.

Forces to change the posture of the vehicle 90 are described using FIG. 2. In FIG. 2, an anti-dive force FbAD and a front wheel anti-lift force FdAL are represented by outline arrows as forces to act on the vehicle 90 by the suspension device for the front wheels FL, FR. In FIG. 2, an anti-squat force FdAS and a rear wheel anti-lift force FbAL are represented by outline arrows as forces to act on the vehicle 90 by the suspension device for the rear wheels RL, RR. Note that, the outline arrows indicate the directions of forces and do not indicate the actual magnitudes of forces.

The anti-dive force FbAD is described. The anti-dive force FbAD is a force to act by application of a braking force to each of the front wheels FL, FR. The anti-dive force FbAD is a force to inhibit the vehicle body front part 91F from being depressed. A direction in which the anti-dive force FbAD acts is a direction to displace the vehicle front part away from the road surface.

The front wheel anti-lift force FdAL is described. The front wheel anti-lift force FdAL is a force to act by transmission of a driving force to each of the front wheels FL, FR. The front wheel anti-lift force FdAL is a force to inhibit the vehicle body front part 91F from being lifted up. A direction in which the front wheel anti-lift force FdAL acts is a direction to displace the vehicle front part closer to the road surface.

The rear wheel anti-lift force FbAL is described. The rear wheel anti-lift force FbAL is a force to act by application of a braking force to each of the rear wheels RL, RR. The rear wheel anti-lift force FbAL is a force to inhibit the vehicle body rear part 91R from being lifted up. A direction in which the rear wheel anti-lift force FbAL acts is a direction to displace the vehicle rear part closer to the road surface.

The anti-squat force FdAS is described. The anti-squat force FdAS is a force to act by transmission of a driving force to each of the rear wheels RL, RR. The anti-squat force FdAS is a force to inhibit the vehicle body rear part 91R from being depressed. A direction in which the anti-squat force FdAS acts is a direction to displace the vehicle rear part away from the road surface.

The anti-dive force FbAD can be represented by the following relational formula (Formula 1) using the front wheel braking force BFf and the first angle θf. The front wheel anti-lift force FdAL can be represented by the following relational formula (Formula 2) using the front wheel driving force DFf and the second angle θf.

$$FbAD = BFf \cdot \tan\theta f \quad \text{(Formula 1)}$$

$$FdAL = DFf \cdot \tan\Phi f \quad \text{(Formula 2)}$$

As represented by the relational formula (Formula 1), the anti-dive force FbAD becomes larger as the front wheel braking force BFf becomes larger. The anti-dive force FbAD becomes larger as tan θf, which is based on the first angle θf, becomes larger. As represented by the relational formula (Formula 2), the front wheel anti-lift force FdAL becomes larger as the front wheel driving force DFf becomes larger. The front wheel anti-lift force FdAL becomes larger as tan Φf, which is based on the second angle Φf, becomes larger.

The rear wheel anti-lift force FbAL can be represented by the following relational formula (Formula 3) using the rear wheel braking force BFr and the third angle θr. The anti-squat force FdAS can be represented by the following relational formula (Formula 4) using the rear wheel driving force DFr and the fourth angle Φr.

$$FbAL = BFr \cdot \tan\theta r \quad \text{(Formula 3)}$$

$$FdAS = DFr \cdot \tan\Phi r \quad \text{(Formula 4)}$$

As represented by the relational formula (Formula 3), the rear wheel anti-lift force FbAL becomes larger as the rear wheel braking force BFr becomes larger. The rear wheel anti-lift force FbAL becomes larger as tan θr, which is based on the third angle θr, becomes larger. As represented by the relational formula (Formula 4), the anti-squat force FdAS becomes larger as the rear wheel driving force DFr becomes larger. The anti-squat force FdAS becomes larger as tan Φr, which is based on the fourth angle Φr, becomes larger.

In the suspension device of the vehicle, its suspension geometry is set in such a way that, when the front wheel braking force BFf and the rear wheel braking force BFr have the same magnitude, one of the anti-dive force FbAD and the rear wheel anti-lift force FbAL has a larger magnitude than the other. In the suspension device for the front wheels FL, FR and the suspension device for the rear wheels RL, RR included in the vehicle 90, their suspension geometry is set in such a way that, when the front wheel braking force BFf and the rear wheel braking force BFr have the same magnitude, the rear wheel anti-lift force FbAL has a larger magnitude than the anti-dive force FbAD. In other words, their suspension geometry is set in such a way that the third angle θr is larger than the first angle θf.

In the suspension device of the vehicle, its suspension geometry is set in such a way that, when the front wheel driving force DFf and the rear wheel driving force DFr have the same magnitude, one of the front wheel anti-lift force FdAL and the anti-squat force FdAS has a larger magnitude than the other. In the suspension device for the front wheels FL, FR and the suspension device for the rear wheels RL, RR included in the vehicle 90, their suspension geometry is set in such a way that, when the front wheel driving force DFf and the rear wheel driving force DFr have the same magnitude, the anti-squat force FdAS has a larger magnitude than the front wheel anti-lift force FdAL. In other words, their suspension geometry is set in such a way that the fourth angle Φr is larger than the second angle Φf.

A dynamic equation regarding pitching of the vehicle 90 can be represented by the following relational formula (Formula 5).

$$Iy \cdot \theta y'' = \{(BFf + BFr) - (DFf + DFr)\} \cdot H - \quad \text{(Formula 5)}$$

-continued $$FbAD \cdot Lf - FbAL \cdot Lr + FdAL \cdot Lf + Fdas \cdot Lr$$

"Iy" in the relational formula (Formula 5) indicates a pitch inertia moment. "θy''" in the relational formula (Formula 5) indicates a second order differential value of the pitch angle θy. In other words, "θy''" indicates a pitch angular acceleration.

As described above, by adjusting the front wheel braking force BFf and the rear wheel braking force BFr, the vehicle 90 can adjust the anti-dive force FbAD and the rear wheel anti-lift force FbAL to act on the vehicle 90. The anti-dive force FbAD and the rear wheel anti-lift force FbAL are forces working in the directions to suppress the pitching moment M. The pitching moment M can be adjusted by adjusting the front wheel braking force BFf and the rear wheel braking force BFr.

The vehicle 90 illustrated in FIG. 1 includes various sensors. FIG. 1 illustrates, as an example of the various sensors: a posture detection sensor 21; a brake sensor 22; and an accelerator sensor 23. Detection signals from the various sensors are input to a control apparatus 10 included in the vehicle 90.

The posture detection sensor 21 is a sensor that detects a parameter indicating the posture of the vehicle 90. As an example of the posture detection sensor 21, the posture detection sensor can detect the pitch angular velocity of the vehicle 90. The posture detection sensor 21 may be a sensor that can detect the roll angle of the vehicle 90.

The brake sensor 22 can detect the amount of manipulation of the braking manipulation member 61. The amount of manipulation of the braking manipulation member 61 can be used as a reference at the time of calculating a target value for the total braking force of the vehicle 90. The brake sensor 22 may be a sensor that detects a pressure to be applied to the braking manipulation member 61 for manipulating the braking manipulation member 61.

The accelerator sensor 23 can detect the amount of manipulation of a driving manipulation member. The driving manipulation member is an accelerator pedal, for example. The amount of manipulation of the driving manipulation member can be used as a reference at the time of calculating a target value for the total driving force of the vehicle 90.

The vehicle 90 includes the control apparatus 10. The control apparatus 10 performs control over the driving apparatus 71. The control apparatus 10 also performs control over the braking apparatus 80. Note that, the control apparatus 10 includes a CPU and a ROM. The ROM of the control apparatus 10 stores therein various programs for causing the CPU to execute various kinds of control.

The control apparatus 10 is constituted of multiple functional units for executing various kinds of control. FIG. 1 illustrates, as an example of the functional units: a traveling state detection unit 11; a state judgment unit 12; and a distribution setting unit 13.

The traveling state detection unit 11 can calculate a parameter indicating the state of the vehicle 90. The traveling state detection unit 11 can calculate a pitch angle based on a detection signal from the posture detection sensor 21. The traveling state detection unit 11 can also calculate a pitch angular velocity. The traveling state detection unit 11 can also calculate a pitch angular acceleration. When the posture detection sensor 21 is a sensor that can also detect the roll angle of the vehicle 90, the traveling state detection unit 11 can also calculate a roll angle. Other parameters that the traveling state detection unit 11 can calculate include a vehicle velocity based on a detection signal from a wheel velocity sensor, the longitudinal acceleration of the vehicle 90, and so on.

The state judgment unit 12 includes a calculator that is configured to calculate a value indicating a target posture of the vehicle 90 during traveling. The calculator calculates a target pitch angle θyT as the value indicating the target posture of the vehicle 90 during traveling. The calculator calculates the target pitch angle θyT repetitively at a predetermined cycle. The calculator can calculate the target pitch angle θyT based on the actual pitch angle of the vehicle 90. The calculator may refer to the longitudinal acceleration of the vehicle 90 when calculating the target pitch angle θyT. When calculating the target pitch angle θyT, the calculator may refer to whether or not the vehicle 90 is traveling in automated driving control. Other parameters that the calculator can refer to when calculating the target pitch angle θyT include the amount of manipulation of the braking manipulation member 61, the amount of manipulation of the driving manipulation member, the amount of manipulation of a steering manipulation member, and so on.

For example, if judging that the vehicle 90 is going straight, the calculator of the state judgment unit 12 calculates the target pitch angle θyT so that it becomes smaller. For example, if judging that the vehicle 90 is turning, the calculator calculates the target pitch angle θyT so that it becomes larger. Besides, if the vehicle 90 is traveling in automated driving control, the calculator can calculate the target pitch angle θyT so that it becomes smaller.

When calculating the target pitch angle θyT, the calculator of the state judgment unit 12 may refer to a parameter selected among: the number of occupants in the vehicle 90; the position of an occupant; the posture of an occupant; and the direction of eyes of an occupant. For example, if an occupant is sitting on a rear seat of the vehicle 90, the calculator can calculate the target pitch angle θyT so that it becomes smaller. For example, if an occupant is looking at his/her hands, the calculator can calculate the target pitch angle θyT so that it becomes smaller.

The state judgment unit 12 includes a judgment unit that is configured to judge the size of the target pitch angle θyT. The judgment unit can judge whether or not the target pitch angle θyT is small. The judgment unit can also judge whether or not the target pitch angle θyT is large. The judgment unit can also judge whether or not the target pitch angle θyT has changed from a small size to a large size. The judgment unit can also judge whether or not the target pitch angle θyT has changed from a large size to a small size.

The distribution setting unit 13 is configured to set a braking force distribution ratio. The braking force distribution ratio is a ratio for distributing a braking force to be applied on the vehicle 90 at the time of braking the vehicle 90 between a braking force to be applied on the front wheels FL, FR and a braking force to be applied on the rear wheels RL, RR. In other words, the braking force distribution ratio is a ratio for distributing the total braking force of the vehicle 90 between the front wheel braking force BFf and the rear wheel braking force BFr. The distribution setting unit 13 adjusts the braking force distribution ratio to thereby control the posture of the vehicle 90. The distribution setting unit 13 stores therein a basic braking force ratio as a reference value for adjusting the braking force distribution ratio. The basic braking force ratio is a value of the braking force distribution ratio obtained when no control for adjusting the braking force distribution ratio is performed. For example, the basic braking force ratio indicates a ratio of a braking force, which is applied by the braking apparatus 80 in response to manipulation of the braking manipulation member 61, between the front wheel braking force BFf and the rear wheel braking force BFr when no control for adjusting the braking force distribution ratio is performed. Note that, the control for adjusting the braking force distribution ratio is not limited to one exemplified in this embodiment.

The braking force distribution ratio is further described. For example, when the ratio of the front wheel braking force BFf in the braking force distribution ratio is increased while the target value for the total braking force is kept constant, the front wheel braking force BFf is increased and the rear wheel braking force BFr is reduced. For example, when the ratio of the rear wheel braking force BFr in the braking force distribution ratio is increased while the target value for the total braking force is kept constant, the rear wheel braking force BFr is increased and the front wheel braking force BFf is reduced. For example, when the target value for the total braking force is increased or reduced while the braking force distribution ratio is kept constant, the front wheel braking force BFf and the rear wheel braking force BFr are adjusted so that the changed total braking force is distributed between the front wheel braking force BFf and the rear wheel braking force BFr according to the braking force distribution ratio.

Another example of the control performed by the control apparatus 10 is control for actuating the braking apparatus 80. The control apparatus 10 can apply a braking force on the wheels of the vehicle 90 by actuating the braking apparatus 80. This control makes it possible to adjust the ratio between the front wheel braking force BFf and the rear wheel braking force BFr based on the braking force distribution ratio set by the distribution setting unit 13.

Still another example of the control performed by the control apparatus 10 is control for actuating the driving apparatus 71. The control apparatus 10 can transmit a driving force to the wheels of the vehicle 90 by actuating the driving apparatus 71.

The control apparatus 10 is configured to execute processing for controlling the posture of the vehicle 90. In this posture control, the control apparatus can control the pitch angle θy of the vehicle 90 by adjusting the braking force distribution ratio during braking of the vehicle 90. Hereinbelow, this processing is described using FIGS. 3 and 4. The ROM included in the control apparatus 10 stores therein control programs which are programs for executing the processing illustrated in FIGS. 3 and 4. The processing illustrated in FIGS. 3 and 4 is implemented by causing the CPU to execute the control programs stored in the ROM.

Figure 3:
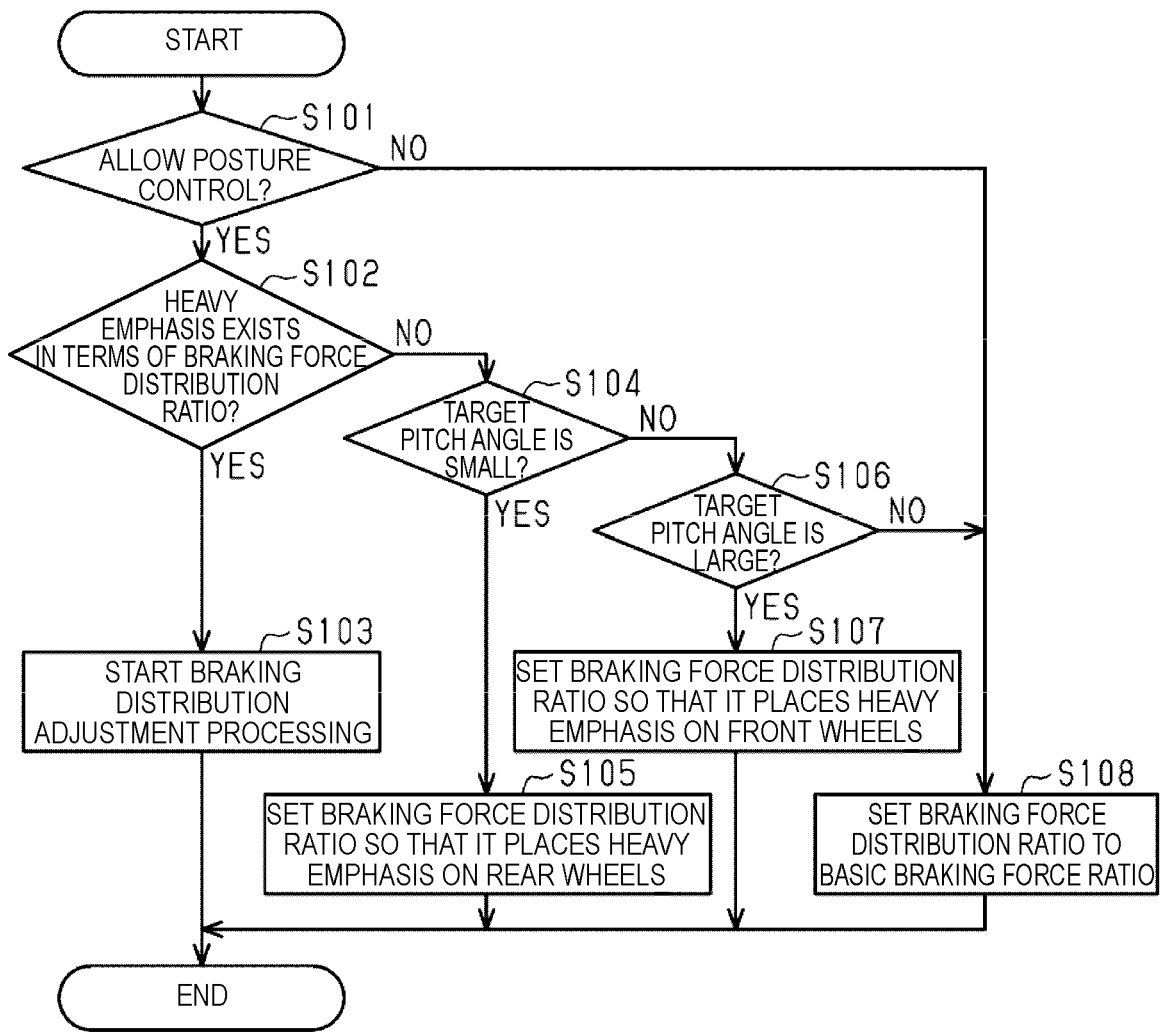
FIG. 3 is a flowchart illustrating a flow of processing to be executed by the control apparatus.
Figure 4:
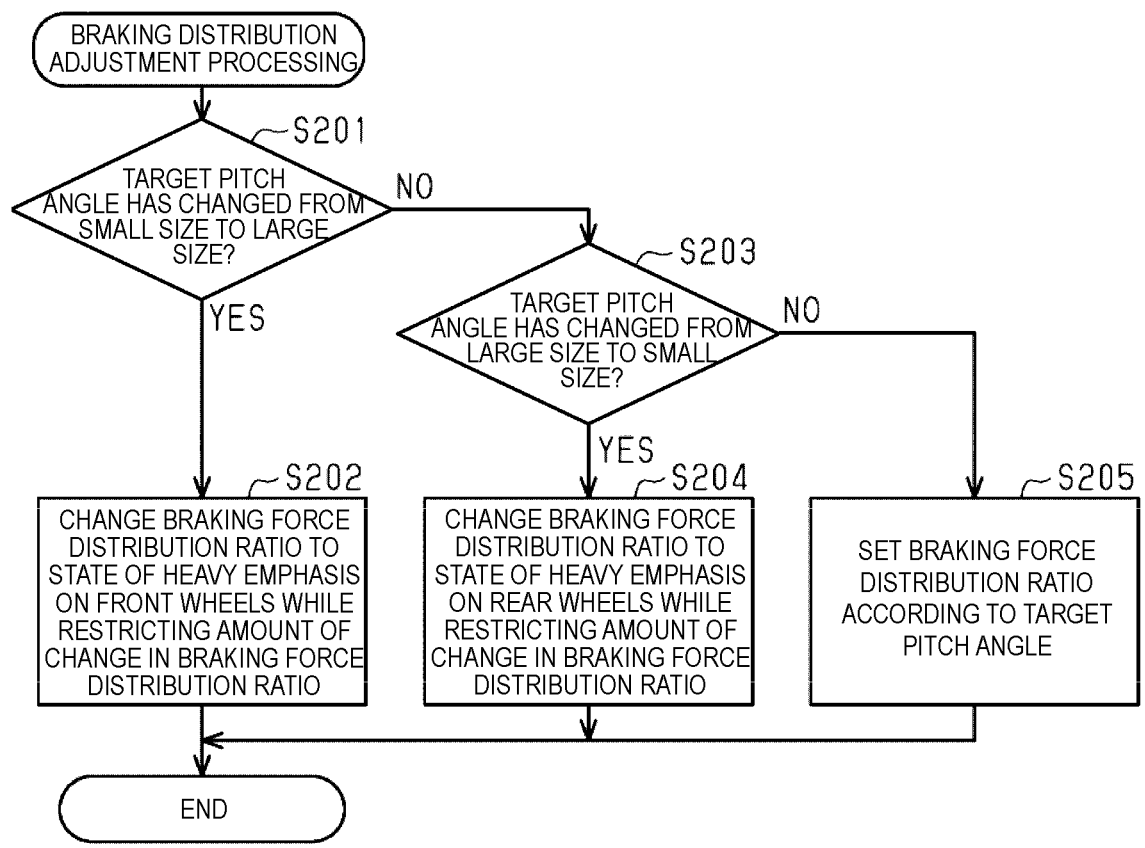
FIG. 4 is a flowchart illustrating a flow of processing to be executed by the control apparatus.

FIG. 3 illustrates a flow of the processing to be executed by the control apparatus 10. This processing routine is executed during braking of the vehicle 90 repetitively at a predetermined cycle. This processing routine may be executed repetitively at a predetermined cycle if braking is presumed to start.

When this processing routine starts, firstly, at Step S101, the control apparatus 10 judges whether or not the posture control is executable. For example, the control apparatus 10 can perform control so as not to allow the posture control if a manipulation speed of the braking manipulation member 61 is larger than a specified judgment speed. Meanwhile, the control apparatus 10 may perform control so as not to allow the posture control if a deceleration speed of the vehicle 90 is larger than a specified judgment deceleration speed. If allowing the posture control (S101: YES), the control apparatus 10 moves the processing to Step S102.

In the processing at Step S102, if there is no heavy emphasis in terms of the braking force distribution ratio, that is, if the braking force distribution ratio is the basic braking force ratio (S102: NO), the control apparatus 10 moves the processing to Step S104.

At Step S104, the control apparatus 10 causes the state judgment unit 12 to judge whether or not the target pitch angle θyT is small. A state in which the target pitch angle θyT is small denotes that a target posture of the vehicle 90 is close to a horizontal posture. For example, the state judgment unit 12 judges that the target pitch angle θyT is small if the target pitch angle θyT is smaller than a first judgment value. On the other hand, the state judgment unit 12 does not judge that the target pitch angle θyT is small if the target pitch angle θyT is equal to or larger than the first judgment value. The first judgment value is set in advance as a judgment value for judging whether or not the target posture of the vehicle 90 is close to a horizontal posture. The first judgment value is a value calculated based on a pitch angle obtained when the vehicle 90 is in a horizontal posture. In addition, when making judgments on the target pitch angle θyT, the state judgment unit 12 can store a value of the target pitch angle θyT judged this time as a previous target pitch angle θyT0.

In the processing at Step S104, if it is judged that the target pitch angle θyT is small (S104: YES), the control apparatus 10 moves the processing to Step S105.

At Step S105, the control apparatus 10 causes the distribution setting unit 13 to set the braking force distribution ratio. The distribution setting unit 13 sets the braking force distribution ratio so that the pitch angle θy of the vehicle 90 follows the target pitch angle θyT. In this example, the distribution setting unit 13 sets the braking force distribution ratio so that the braking force distribution ratio places a heavy emphasis on the rear wheels. The heavy emphasis on the rear wheels means to increase the ratio of the rear wheel braking force BFr and reduce the ratio of the front wheel braking force BFf as compared with the basic braking force ratio. On the other hand, the heavy emphasis on the front wheels means to increase the ratio of the front wheel braking force BFf and reduce the ratio of the rear wheel braking force BFr as compared with the basic braking force ratio.

An exemplary configuration of causing the distribution setting unit 13 to set the braking force distribution ratio is described. The distribution setting unit 13 stores therein an arithmetic operation map that indicates the relationship between the target pitch angle θyT during braking and the braking force distribution ratio. The distribution setting unit 13 calculates the braking force distribution ratio based on this arithmetic operation map. The arithmetic operation map outputs the braking force distribution ratio such that a heavier emphasis is placed on the front wheels as the input target pitch angle θyT is larger. The arithmetic operation map outputs the braking force distribution ratio such that a heavier emphasis is placed on the rear wheels as the input target pitch angle θyT is closer to "0".

When the braking force distribution ratio is set by the processing at Step S105 so that a heavy emphasis is placed on the rear wheels, the control apparatus 10 once terminates this processing routine. When the braking force distribution ratio is set so that a heavy emphasis is placed on the rear wheels and, as a result of this event, the braking apparatus 80 is controlled according to the braking force distribution ratio thus set, the ratio of the rear wheel braking force BFr is set larger. For example, the rear wheel braking force BFr is increased and the front wheel braking force BFf is reduced.

On the other hand, if it is not judged in the processing at Step S104 that the target pitch angle θyT is small (S104: NO), the control apparatus 10 moves the processing to Step S106.

At Step S106, the control apparatus 10 causes the state judgment unit 12 to judge whether or not the target pitch angle θyT is large. A state in which the target pitch angle θyT is large denotes that the target posture of the vehicle 90 is a posture of being tilted forward. For example, the state judgment unit 12 judges that the target pitch angle θyT is large if the target pitch angle θyT is equal to or larger than a second judgment value. On the other hand, the state judgment unit 12 does not judge that the target pitch angle θyT is large if the target pitch angle θyT is smaller than the second judgment value. The second judgment value is set in advance as a judgment value for judging whether or not the target posture of the vehicle 90 is a posture of being tilted forward. The second judgment value is a value calculated based on a pitch angle obtained when the vehicle 90 is in a posture of being tilted forward. An example of the second judgment value is a value larger than the first judgment value. The second judgment value may be a value equal to or larger than the first judgment value. In addition, when making judgments on the target pitch angle θyT, the state judgment unit 12 can store a value of the target pitch angle θyT judged this time as the previous target pitch angle θyT0.

In the processing at Step S106, if it is judged that the target pitch angle θyT is large (S106: YES), the control apparatus 10 moves the processing to Step S107.

At Step S107, the control apparatus 10 causes the distribution setting unit 13 to set the braking force distribution ratio. In this example, the distribution setting unit 13 sets the braking force distribution ratio so that the braking force distribution ratio places a heavy emphasis on the front wheels. For example, the distribution setting unit 13 can calculate the braking force distribution ratio based on the arithmetic operation map described in the processing at Step S105.

When the braking force distribution ratio is set by the processing at Step S107 so that a heavy emphasis is placed on the front wheels, the control apparatus 10 once terminates this processing routine. When the braking force distribution ratio is set so that a heavy emphasis is placed on the front wheels and, as a result of this event, the braking apparatus 80 is controlled according to the braking force distribution ratio thus set, the ratio of the front wheel braking force BFf is set larger. For example, the front wheel braking force BFf is increased and the rear wheel braking force BFr is reduced.

On the other hand, if it is not judged that the target pitch angle θyT is large in the processing at Step S106 (S106: NO), the control apparatus 10 moves the processing to Step S108. For example, when the second judgment value is set larger than the first judgment value, the control apparatus 10 moves the processing to Step S108 if the target pitch angle θyT is equal to or larger than the first judgment value and the target pitch angle θyT is smaller than the second judgment value. In other words, the control apparatus 10 moves the processing to Step S108 if the target pitch angle θyT is not small and the target pitch angle θyT is not large either.

At Step S108, the control apparatus 10 causes the distribution setting unit 13 to set the braking force distribution ratio. In this example, the distribution setting unit 13 sets the braking force distribution ratio so that the braking force distribution ratio is equal to the basic braking force ratio. As a result, when the braking apparatus 80 is controlled, the front wheel braking force BFf and the rear wheel braking force BFr are applied according to the basic braking force ratio. When the braking force distribution ratio is set to the basic braking force ratio, the control apparatus 10 once terminates this processing routine.

Meanwhile, if not allowing the posture control in the processing at Step S101 (S101: NO), the control apparatus 10 also moves the processing to Step S108. The control apparatus 10 executes the processing at Step S108, and then terminates this processing routine.

On the other hand, in the processing at Step S102, if there is a heavy emphasis in terms of the braking force distribution ratio, that is, if the braking force distribution ratio is different from the basic braking force ratio, the control apparatus 10 moves the processing to Step S103. At Step S103, the control apparatus 10 starts braking distribution adjustment processing. When the braking distribution adjustment processing starts, the control apparatus 10 once terminates this processing routine. Subsequently, the braking distribution adjustment processing is described with reference to FIG. 4.

FIG. 4 illustrates a flow of the braking distribution adjustment processing to be executed by the control apparatus 10. This processing routine starts in response to the processing at Step S103 illustrated in FIG. 3. Once this processing routine starts, firstly, at Step S201, the control apparatus 10 causes the state judgment unit 12 to judge whether or not the target pitch angle θyT has changed from a small size to a large size. For example, if the previous target pitch angle θyT0 stored is smaller than the first judgment value and the target pitch angle θyT at the time of the processing at Step S201 is equal to or larger than the second judgment value, the state judgment unit 12 judges that the target pitch angle θyT has changed to a large size. If the previous target pitch angle θyT0 is equal to or larger than the first judgment value or the target pitch angle θyT is smaller than the second judgment value, the state judgment unit 12 judges that the target pitch angle θyT has not changed to a large size. In addition, when making judgments on the target pitch angle θyT, the state judgment unit 12 can store a value of the target pitch angle θyT judged this time as the previous target pitch angle θyT0.

In the processing at Step S201, if the target pitch angle θyT has changed to a large size (S201: YES), the control apparatus 10 moves the processing to Step S202.

At Step S202, the control apparatus 10 causes the distribution setting unit 13 to set the braking force distribution ratio. In the processing at Step S202, since the target pitch angle θyT is large, the distribution setting unit 13 sets the braking force distribution ratio so that the braking force distribution ratio places a heavy emphasis on the front wheels according to the target pitch angle θyT. In addition, the control apparatus 10 causes the distribution setting unit 13 to restrict a change in the braking force distribution ratio. In other words, the distribution setting unit 13 changes the braking force distribution ratio from the state of the heavy emphasis on the rear wheels to the state of the heavy emphasis on the front wheels while restricting the change in the braking force distribution ratio.

In an example of restricting the change in the braking force distribution ratio, the distribution setting unit 13 restricts the amount of change in the braking force distribution ratio. The distribution setting unit 13 sets a target value for the braking force distribution ratio so that the current braking force distribution ratio follows the braking force distribution ratio according to the target pitch angle θyT. In addition, when setting the target value for the braking force distribution ratio, the distribution setting unit 13 sets the target value so that the braking force distribution ratio is changed per unit time by the amount of change equal to or smaller than a first restriction amount. If the amount of change by which the braking force distribution ratio is changed per unit time is large, the pitch angular velocity of the vehicle 90 might be increased in response to adjustment of the front wheel braking force BFf and the rear wheel braking force BFr, which might make an occupant of the vehicle 90 feel a sense of discomfort. The first restriction amount is a value calculated in advance through an experiment and the like as a restriction amount such that an occupant of the vehicle 90 is less likely to feel a sense of discomfort if the amount of change in the braking force distribution ratio per unit time is equal to or smaller than the first restriction amount. In this way, the distribution setting unit 13 can change the braking force distribution ratio gradually from the state of the heavy emphasis on the rear wheels to the state of the heavy emphasis on the front wheels.

The braking force distribution ratio is gradually changed in the processing at Step S202, and thus the ratio of the front wheel braking force BFf is gradually increased. For example, the front wheel braking force BFf is gradually increased and the rear wheel braking force BFr is gradually reduced. After causing the distribution setting unit 13 to set the braking force distribution ratio, the control apparatus 10 once terminates this processing routine.

On the other hand, in the processing at Step S201, if the target pitch angle θyT has not changed to a large size (S201: NO), the control apparatus 10 moves the processing to Step S203.

At Step S203, the control apparatus 10 causes the state judgment unit 12 to judge whether or not the target pitch angle θyT has changed from a large size to a small size. For example, if the previous target pitch angle θyT0 stored is equal to or larger than the second judgment value and the target pitch angle θyT at the time of the processing at Step S203 is smaller than the first judgment value, the state judgment unit 12 judges that the target pitch angle θyT has changed to a small size. If the previous target pitch angle θyT0 is smaller than the second judgment value or the target pitch angle θyT is equal to or larger than the first judgment value, the state judgment unit 12 judges that the target pitch angle θyT has not changed to a small size. Note that, when making judgments on the target pitch angle θyT, the state judgment unit 12 can store a value of the target pitch angle θyT judged this time as the previous target pitch angle θyT0.

In the processing at Step S203, if the target pitch angle θyT has changed to a small size (S203: YES), the control apparatus 10 moves the processing to Step S204.

At Step S204, the control apparatus 10 causes the distribution setting unit 13 to set the braking force distribution ratio. In the processing at Step S204, since the target pitch angle θyT is small, the distribution setting unit 13 sets the braking force distribution ratio so that the braking force distribution ratio places a heavy emphasis on the rear wheels according to the target pitch angle θyT. In addition, the control apparatus 10 causes the distribution setting unit 13 to restrict a change in the braking force distribution ratio. In other words, the distribution setting unit 13 changes the braking force distribution ratio from the state of the heavy emphasis on the front wheels to the state of the heavy emphasis on the rear wheels while restricting the change in the braking force distribution ratio. For example, the distribution setting unit 13 restricts the amount of change in the braking force distribution ratio by the same processing as the processing at Step S202. In this way, the distribution setting unit 13 can change the braking force distribution ratio gradually from the state of the heavy emphasis on the front wheels to the state of the heavy emphasis on the rear wheels.

The braking force distribution ratio is gradually changed in the processing at Step S204, and thus the ratio of the rear wheel braking force BFr is gradually increased. For example, the rear wheel braking force BFr is gradually increased and the front wheel braking force BFf is gradually reduced. After causing the distribution setting unit 13 to set the braking force distribution ratio, the control apparatus 10 once terminates this processing routine.

On the other hand, in the processing at Step S203, if the target pitch angle θyT has not changed to a small size (S203: NO), the control apparatus 10 moves the processing to Step S205.

At Step S205, the control apparatus 10 causes the distribution setting unit 13 to set the braking force distribution ratio according to the target pitch angle θyT. The distribution setting unit 13 can calculate the braking force distribution ratio using the arithmetic operation map described in the processing at Step S105. After causing the distribution setting unit 13 to set the braking force distribution ratio, the control apparatus 10 once terminates this processing routine.

The control apparatus 10 may set the braking force distribution ratio to the basic braking force ratio once braking is over. The control apparatus 10 may cause the state judgment unit 12 to delete the stored previous target pitch angle θyT0 once braking is over. For example, it is possible to judge that braking is over when manipulation of the braking manipulation member 61 is cancelled. It is also possible to judge that braking is over when the vehicle 90 stops.

The operation and effect of this embodiment are described.

In the control apparatus 10, if the target pitch angle θyT is small, the braking force distribution ratio is set so as to place a heavy emphasis on the rear wheels (S105). In other words, the ratio of the rear wheel braking force BFr is set larger. In the vehicle 90, its suspension geometry is set in such a way that, when the front wheel braking force BFf and the rear wheel braking force BFr have the same magnitude, the rear wheel anti-lift force FbAL has a larger magnitude than the anti-dive force FbAD. Accordingly, by increasing the ratio of the rear wheel braking force BFr, it is possible to make the rear wheel anti-lift force FbAL of a larger magnitude act on the vehicle 90 while inhibiting the anti-dive force FbAD from being reduced. To put it differently, the magnitude of the rear wheel anti-lift force FbAL accounts for a larger percentage of the sum of the magnitude of the anti-dive force FbAD and the magnitude of the rear wheel anti-lift force FbAL. Thus, a force to act on the vehicle 90 by the anti-dive force FbAD and the rear wheel anti-lift force FbAL, that is, a force to inhibit the vehicle 90 from being tilted forward tends to become larger. Thereby, it is possible to inhibit the vehicle 90 from becoming a forward tilt posture. In other words, it is possible to make the posture of the vehicle 90 closer to a horizontal posture, and thus improve the vehicle 90's ride comfort.

In the control apparatus 10, the target pitch angle θyT indicating the target posture of the vehicle 90 is calculated to be smaller when the vehicle 90 is going straight. Hence, according to the control apparatus 10, it is possible to inhibit the vehicle 90 from becoming a forward tilt posture when the vehicle 90 is going straight during braking of the vehicle 90.

In the control apparatus 10, the target pitch angle θyT indicating the target posture of the vehicle 90 is calculated to be smaller when the vehicle 90 is in automated driving mode. Hence, according to the control apparatus 10, it is possible to inhibit the vehicle 90 from becoming a forward tilt posture during braking of the vehicle in automated driving control.

In the control apparatus 10, the target pitch angle θyT indicating the target posture of the vehicle 90 is calculated to be smaller when an occupant of the vehicle 90 is looking at his/her hands. Hence, according to the control apparatus 10, it is possible to inhibit the vehicle 90 from becoming a forward tilt posture when an occupant of the vehicle 90 is looking at his/her hands during braking of the vehicle 90. This makes an occupant less likely to feel a sense of discomfort.

Meanwhile, in the control apparatus 10, if the target pitch angle θyT is large, the braking force distribution ratio is set so as to place a heavy emphasis on the front wheels (S107). In other words, the ratio of the front wheel braking force BFf is set larger. In the vehicle 90, its suspension geometry is set in such a way that, when the front wheel braking force BFf and the rear wheel braking force BFr have the same magnitude, the rear wheel anti-lift force FbAL has a larger magnitude than the anti-dive force FbAD. Accordingly, by increasing the ratio of the front wheel braking force BFf, it is possible to reduce the rear wheel anti-lift force FbAL while inhibiting the anti-dive force FbAD from being increased. To put it differently, the magnitude of the rear wheel anti-lift force FbAL accounts for a smaller percentage of the sum of the magnitude of the anti-dive force FbAD and the magnitude of the rear wheel anti-lift force FbAL. Thus, a force to act on the vehicle 90 by the anti-dive force FbAD and the rear wheel anti-lift force FbAL, that is, a force to inhibit the vehicle 90 from being tilted forward tends to become smaller. In other words, it is possible to reduce a force to work in the direction to suppress the pitching moment M. This makes it possible to depress the vehicle body front part 91F and bring the vehicle 90 into a forward tilt posture.

In the control apparatus 10, the target pitch angle θyT indicating the target posture of the vehicle 90 is calculated to be larger when the vehicle 90 is turning. Hence, according to the control apparatus 10, it is possible to bring the vehicle 90 into a forward tilt posture when the vehicle 90 is turning during braking of the vehicle 90. If the vehicle 90 is brought into a forward tilt posture when the vehicle 90 is turning, the front wheel located on the outer side is depressed during turning. This increases the load applied on the front wheel on the outer side during turning. Thereby, the vehicle 90 can turn at a smaller steering angle. In other words, the control apparatus 10 makes it possible to improve operability at the time of turning the vehicle 90 during braking. In addition, by increasing the load applied on the front wheel on the outer side during turning, it makes the vehicle 90 more stable during turning.

Besides, the control apparatus 10 restricts the change in the braking force distribution ratio if the braking force distribution ratio is different from the basic braking force ratio (S202 or S204). Thus, when the vehicle 90 transitions from the state of going straight to the turning state during braking of the vehicle 90, for example, the control apparatus can adjust the braking force distribution ratio so that the braking force distribution ratio is changed gradually to the state of the heavy emphasis on the front wheels. Thereby, it is possible to bring the vehicle 90 into a forward tilt posture gradually while suppressing a sharp change in the pitch angle θy. Meanwhile, when the vehicle 90 transitions from the turning state to the state of going straight during braking of the vehicle 90, for example, the control apparatus can adjust the braking force distribution ratio so that the braking force distribution ratio is changed gradually to the state of the heavy emphasis on the rear wheels. Thereby, it is possible to bring the vehicle 90 into a horizontal posture gradually while suppressing a sharp change in the pitch angle θy. According to the control apparatus 10, it is possible to suppress a sharp change in the pitch angle θy at the time of controlling the posture of the vehicle 90. Hence, according to the control apparatus 10, it is possible to reduce a sense of discomfort felt by an occupant of the vehicle.

Second Embodiment

A control apparatus for a vehicle according to a second embodiment is described with reference to FIGS. 5 to 7 and FIGS. 2 to 4.

Figure 5:
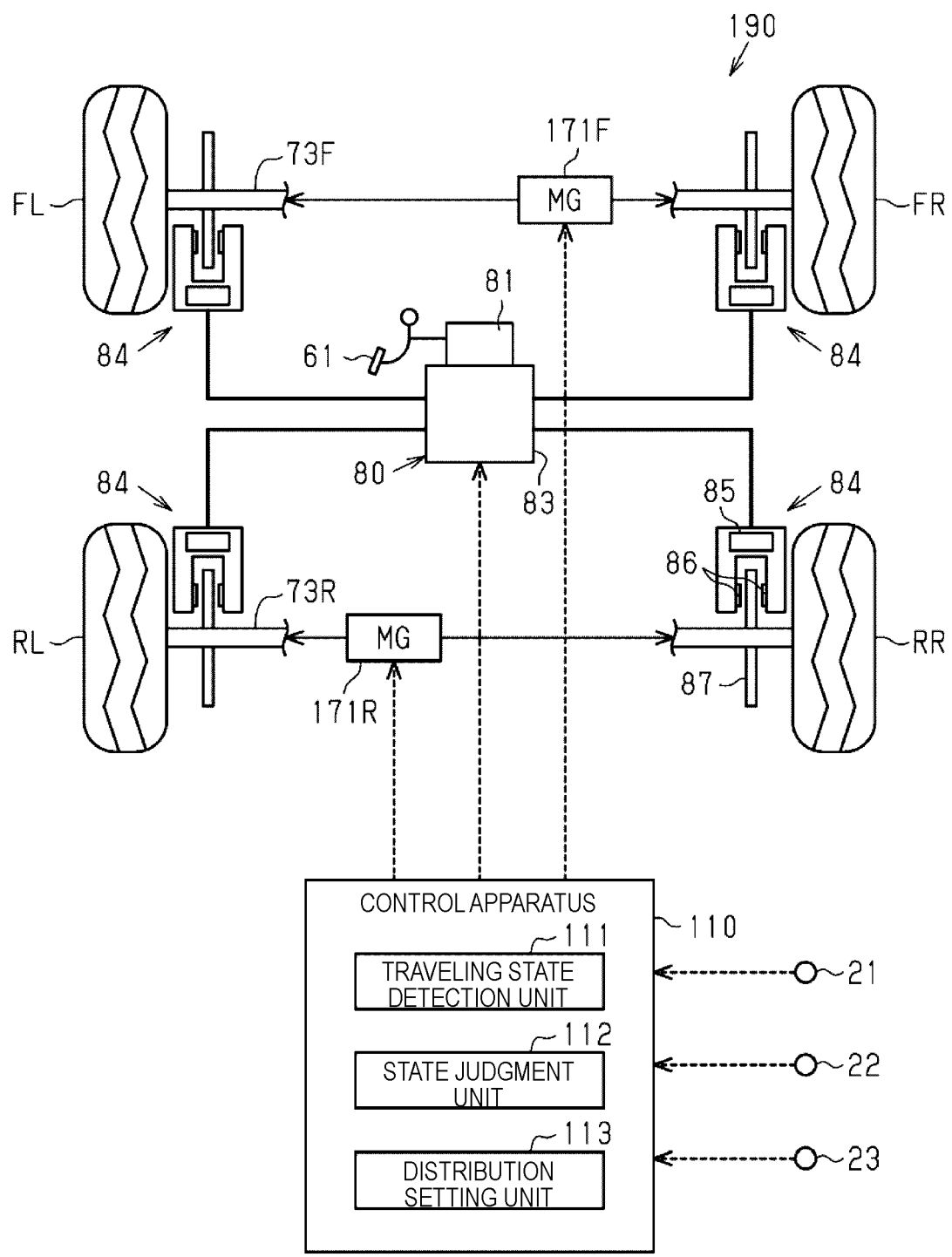
FIG. 5 is a schematic diagram illustrating: a control apparatus for a vehicle according to a second embodiment; and a vehicle to be controlled by the control apparatus.

FIG. 5 illustrates a control apparatus 110 according to the second embodiment and a vehicle 190 that employs the control apparatus 110. Hereinbelow, a configuration common to that of the first embodiment is given the same reference sign as that of the first embodiment, and is not described as needed.

As illustrated in FIG. 5, unlike the vehicle 90 according to the first embodiment, the vehicle 190 is equipped with a first motor generator 171F and a second motor generator 171R as a power source. The first motor generator 171F and the second motor generator 171R constitute a driving apparatus of the vehicle 190.

The vehicle 190 is a four-wheel drive vehicle. A driving force output from the first motor generator 171F is transmitted to the front wheels FL, FR. A driving force output from the second motor generator 171R is transmitted to the rear wheels RL, RR. The vehicle 190 can distribute a driving force to the front wheels FL, FR and to the rear wheels RL, RR.

The vehicle 190 includes the braking apparatus 80. The braking apparatus 80 includes the braking mechanisms 84 that correspond to the respective wheels.

The suspension geometry of the vehicle 190 is common to that of the vehicle 90. In other words, the relationship illustrated using FIG. 2 is also satisfied in the vehicle 190.

The vehicle 190 includes a control apparatus 110. The control apparatus 110 performs control over the first motor generator 171F and the second motor generator 171R constituting the driving apparatus. The control apparatus 110 also performs control over the braking apparatus 80. Note that, the control apparatus 110 includes a CPU and a ROM. The ROM of the control apparatus 110 stores therein various programs for causing the CPU to execute various kinds of control.

The control apparatus 110 is constituted of multiple functional units for executing various kinds of control. FIG. 5 illustrates, as an example of the functional units: a traveling state detection unit 111; a state judgment unit 112; and a distribution setting unit 113.

The functional units of the control apparatus 110 have functions common to those of the functional units of the control apparatus 10. The traveling state detection unit 111 has a function common to that of the traveling state detection unit 11. The state judgment unit 112 has a function common to that of the state judgment unit 12. The distribution setting unit 113 has a function common to that of the distribution setting unit 13.

In addition, the distribution setting unit 113 has a function to set a driving force distribution ratio. The driving force distribution ratio is a ratio for distributing a driving force of the vehicle 190 between a driving force to be applied on the front wheels FL, FR and a driving force to be applied on the rear wheels RL, RR. In other words, the driving force distribution ratio is a ratio for distributing the total driving force of the vehicle 190 between a front wheel driving force DFf and a rear wheel driving force DFr. The distribution setting unit 113 adjusts the driving force distribution ratio to thereby control the posture of the vehicle 190. The distribution setting unit 113 stores therein a basic driving force ratio as a reference value for adjusting the driving force distribution ratio. The basic driving force ratio is a value of the driving force distribution ratio obtained when no control for adjusting the driving force distribution ratio is performed. Note that, the control for adjusting the driving force distribution ratio is not limited to one exemplified in this embodiment.

The driving force distribution ratio is further described. For example, when the ratio of the front wheel driving force DFf in the driving force distribution ratio is increased while the target value for the total driving force is kept constant, the front wheel driving force DFf is increased and the rear wheel driving force DFr is reduced. For example, when the ratio of the rear wheel driving force DFr in the driving force distribution ratio is increased while the target value for the total driving force is kept constant, the rear wheel driving force DFr is increased and the front wheel driving force DFf is reduced. For example, when the target value for the total driving force is increased or reduced while the driving force distribution ratio is kept constant, the front wheel driving force DFf and the rear wheel driving force DFr are adjusted so that the changed total driving force is distributed between the front wheel driving force DFf and the rear wheel driving force DFr according to the driving force distribution ratio.

In the control for actuating the driving apparatus, the control apparatus 110 can transmit the front wheel driving force DFf to the front wheels FL, FR by controlling the first motor generator 171F. In the control for actuating the driving apparatus, the control apparatus 110 can transmit the rear wheel driving force DFr to the rear wheels RL, RR by controlling the second motor generator 171R. In the control for actuating the driving apparatus, the control apparatus can adjust the ratio between the front wheel driving force DFf and the rear wheel driving force DFr based on the driving force distribution ratio set by the distribution setting unit 113.

The vehicle 190 can adjust the front wheel anti-lift force FdAL and the anti-squat force FdAS to act on the vehicle 190 by adjusting the front wheel driving force DFf and the rear wheel driving force DFr. The front wheel anti-lift force FdAL and the anti-squat force FdAS are forces working in the directions to increase the pitching moment M. The pitching moment M can be adjusted by adjusting the front wheel driving force DFf and the rear wheel driving force DFr.

The control apparatus 110 is configured to execute processing for controlling the posture of the vehicle 190. In this posture control, the control apparatus can control the pitch angle $\theta y$ of the vehicle 190 by adjusting the braking force distribution ratio during braking of the vehicle 190. The ROM included in the control apparatus 110 stores therein control programs which are programs for executing the processing in the first embodiment illustrated in FIGS. 3 and 4. The processing illustrated in FIGS. 3 and 4 is implemented by causing the CPU to execute the control programs stored in the ROM.

Further, in the posture control on the vehicle 190, the control apparatus 110 can control the pitch angle $\theta y$ of the vehicle 190 by adjusting the driving force distribution ratio during braking of the vehicle 190. The control apparatus 110 can execute this processing in parallel with the processing illustrated in FIGS. 3 and 4. Hereinbelow, this processing is described using FIGS. 6 and 7. The ROM included in the control apparatus 110 stores therein control programs which are programs for executing the processing illustrated in FIGS. 6 and 7. The processing illustrated in FIGS. 6 and 7 is implemented by causing the CPU to execute the control programs stored in the ROM.

Figure 6:
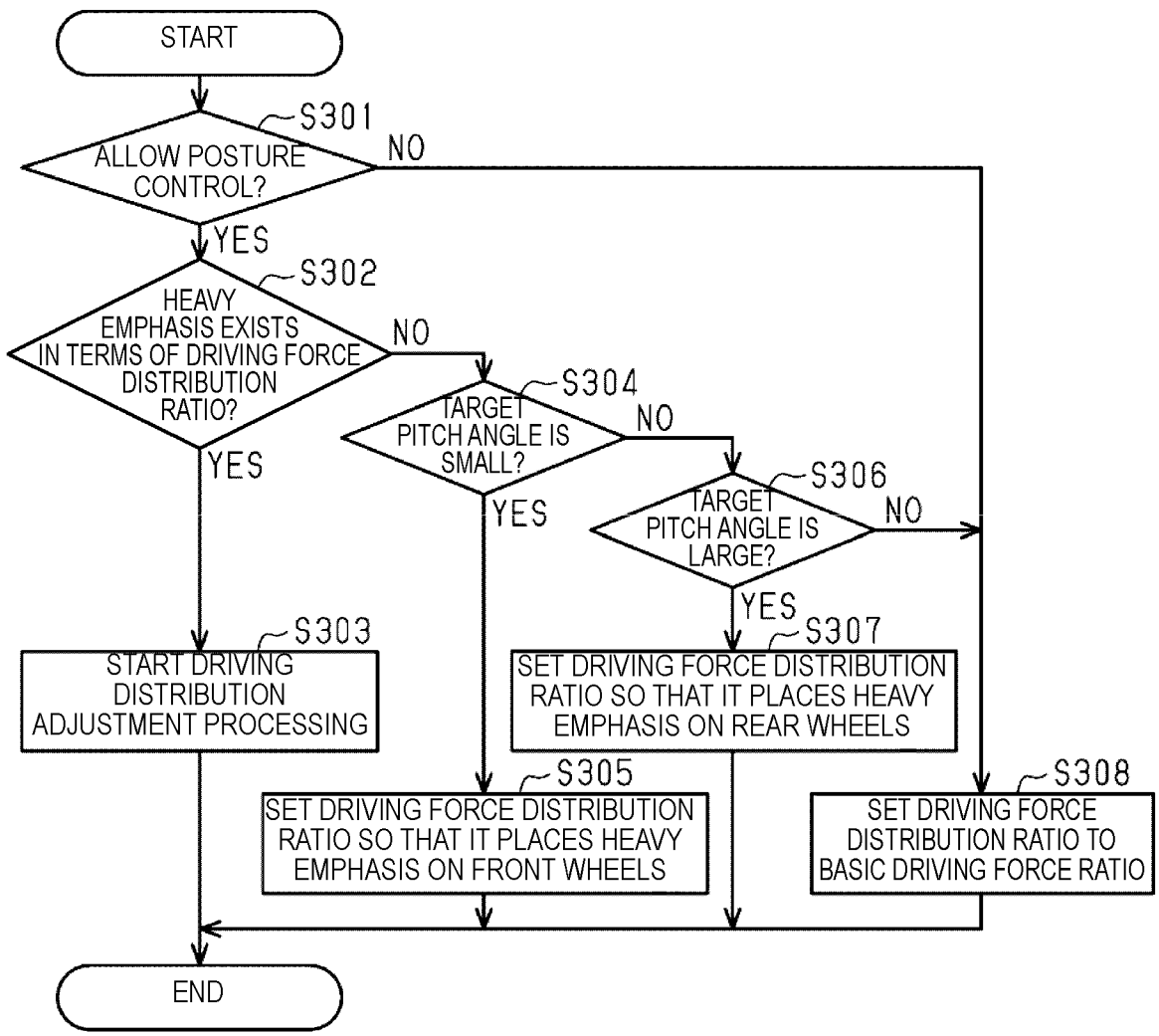
FIG. 6 is a flowchart illustrating a flow of processing to be executed by the control apparatus.
Figure 7:
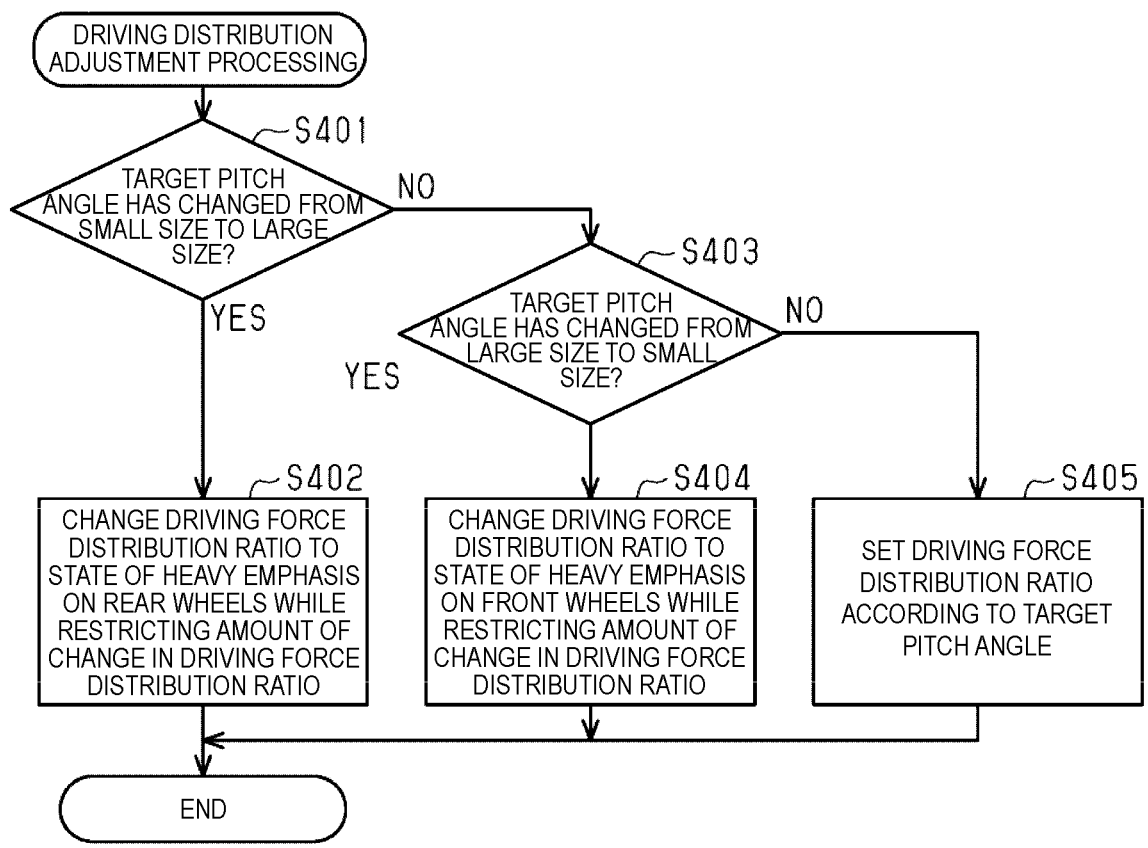
FIG. 7 is a flowchart illustrating a flow of processing to be executed by the control apparatus.

FIG. 6 illustrates a flow of the processing to be executed by the control apparatus 110. This processing routine is executed during braking of the vehicle 190 repetitively at a predetermined cycle.

When this processing routine starts, firstly, at Step S301, the control apparatus 110 judges whether or not the posture control is executable. If allowing the posture control (S301: YES), the control apparatus 110 moves the processing to Step S302.

In the processing at Step S302, if there is no heavy emphasis in terms of the driving force distribution ratio, that is, if the driving force distribution ratio is the basic driving force ratio (S302: NO), the control apparatus 110 moves the processing to Step S304.

At Step S304, the control apparatus 110 causes the state judgment unit 112 to judge whether or not the target pitch angle $\theta yT$ is small. The state judgment unit 112 can judge whether or not the target pitch angle $\theta yT$ is small through processing which is common to the processing at Step S104 in FIG. 3. The state judgment unit 112 may alternatively acquire the result of the processing at Step S104 in FIG. 3. If it is judged that the target pitch angle $\theta yT$ is small (S304: YES), the control apparatus 110 moves the processing to Step S305.

At Step S305, the control apparatus 110 causes the distribution setting unit 113 to set the driving force distribution ratio. The distribution setting unit 113 sets the driving force distribution ratio so that the pitch angle $\theta y$ of the vehicle 190 follows the target pitch angle $\theta yT$. In this example, the distribution setting unit 113 sets the driving force distribution ratio so that the driving force distribution ratio places a heavy emphasis on the front wheels. The heavy emphasis on the front wheels means to increase the ratio of the front wheel driving force DFf and reduce the ratio of the rear wheel driving force DFr as compared with the basic driving force ratio. On the other hand, the heavy emphasis on the rear wheels means to increase the ratio of the rear wheel driving force DFr and reduce the ratio of the front wheel driving force DFf as compared with the basic driving force ratio.

An exemplary configuration of causing the distribution setting unit 113 to set the driving force distribution ratio is described. The distribution setting unit 113 stores therein an arithmetic operation map that indicates the relationship between the target pitch angle $\theta yT$ during braking and the driving force distribution ratio. The distribution setting unit 113 calculates the driving force distribution ratio based on this arithmetic operation map. The arithmetic operation map outputs the driving force distribution ratio such that a heavier emphasis is placed on the rear wheels as the input target pitch angle $\theta yT$ is larger. The arithmetic operation map outputs the driving force distribution ratio such that a heavier emphasis is placed on the front wheels as the input target pitch angle $\theta yT$ is closer to "0".

When the driving force distribution ratio is set by the processing at Step S305 so that a heavy emphasis is placed on the front wheels, the control apparatus 110 once terminates this processing routine. When the driving force distribution ratio is set so that a heavy emphasis is placed on the front wheels and, as a result of this event, the driving apparatus is controlled according to the driving force distribution ratio thus set, the ratio of the front wheel driving force DFf is set larger. For example, the front wheel driving force DFf is increased and the rear wheel driving force DFr is reduced.

On the other hand, if it is not judged in the processing at Step S304 that the target pitch angle θyT is small (S304: NO), the control apparatus 110 moves the processing to Step S306.

At Step S306, the control apparatus 110 causes the state judgment unit 112 to judge whether or not the target pitch angle θyT is large. The state judgment unit 112 can judge whether or not the target pitch angle θyT is large through processing which is common to the processing at Step S106 in FIG. 3. The state judgment unit 112 may alternatively acquire the result of the processing at Step S106 in FIG. 3. If it is judged that the target pitch angle θyT is large (S306: YES), the control apparatus 110 moves the processing to Step S307.

At Step S307, the control apparatus 110 causes the distribution setting unit 113 to set the driving force distribution ratio. The distribution setting unit 113 sets the driving force distribution ratio so that the driving force distribution ratio places a heavy emphasis on the rear wheels. For example, the distribution setting unit 113 can calculate the driving force distribution ratio based on the arithmetic operation map described in the processing at Step S305.

When the driving force distribution ratio is set by the processing at Step S307 so that a heavy emphasis is placed on the rear wheels, the control apparatus 110 once terminates this processing routine. When the driving force distribution ratio is set so that a heavy emphasis is placed on the rear wheels and, as a result of this event, the driving apparatus is controlled according to the driving force distribution ratio thus set, the ratio of the rear wheel driving force DFr is set larger. For example, the rear wheel driving force DFr is increased and the front wheel driving force DFf is reduced.

On the other hand, if it is not judged that the target pitch angle θyT is large in the processing at Step S306 (S306: NO), the control apparatus 110 moves the processing to Step S308.

At Step S308, the control apparatus 110 causes the distribution setting unit 113 to set the driving force distribution ratio. The distribution setting unit 113 sets the driving force distribution ratio so that the driving force distribution ratio is equal to the basic driving force ratio. As a result, when the driving apparatus is controlled, the front wheel driving force DFf and the rear wheel driving force DFr are transmitted according to the basic driving force ratio. When the driving force distribution ratio is set to the basic driving force ratio, the control apparatus 110 once terminates this processing routine.

Meanwhile, if not allowing the posture control in the processing at Step S301 (S301: NO), the control apparatus 110 also moves the processing to Step S308. The control apparatus 110 executes the processing at Step S308, and then terminates this processing routine.

On the other hand, in the processing at Step S302, if there is a heavy emphasis in terms of the driving force distribution ratio, that is, if the driving force distribution ratio is different from the basic driving force ratio, the control apparatus 110 moves the processing to Step S303. At Step S303, the control apparatus 110 starts driving distribution adjustment processing. When the driving distribution adjustment processing starts, the control apparatus 110 once terminates this processing routine. Subsequently, the driving distribution adjustment processing is described with reference to FIG. 7.

FIG. 7 illustrates a flow of the driving distribution adjustment processing to be executed by the control apparatus 110. This processing routine starts in response to the processing at Step S303 illustrated in FIG. 6. Once this processing routine starts, firstly, at Step S401, the control apparatus 110 causes the state judgment unit 112 to judge whether or not the target pitch angle θyT has changed from a small size to a large size. The state judgment unit 112 can judge whether or not the target pitch angle θyT has changed from a small size to a large size through processing which is common to the processing at Step S201 in FIG. 4. The state judgment unit 112 may alternatively acquire the result of the processing at Step S201 in FIG. 4. If the target pitch angle θyT has changed to a large size (S401: YES), the control apparatus 110 moves the processing to Step S402.

At Step S402, the control apparatus 110 causes the distribution setting unit 113 to set the driving force distribution ratio. In the processing at Step S402, since the target pitch angle θyT is large, the distribution setting unit 113 sets the driving force distribution ratio so that the driving force distribution ratio places a heavy emphasis on the rear wheels according to the target pitch angle θyT. In addition, the control apparatus 110 causes the distribution setting unit 113 to restrict a change in the driving force distribution ratio. In other words, the distribution setting unit 113 changes the driving force distribution ratio from the state of the heavy emphasis on the front wheels to the state of the heavy emphasis on the rear wheels while restricting the change in the driving force distribution ratio.

In an example of restricting the change in the driving force distribution ratio, the distribution setting unit 113 restricts the amount of change in the driving force distribution ratio. The distribution setting unit 113 sets a target value for the driving force distribution ratio so that the current driving force distribution ratio follows the driving force distribution ratio according to the target pitch angle θyT. In addition, when setting the target value for the driving force distribution ratio, the distribution setting unit 113 sets the target value so that the driving force distribution ratio is changed per unit time by the amount of change equal to or smaller than a second restriction amount. If the amount of change by which the driving force distribution ratio is changed per unit time is large, the pitch angular velocity of the vehicle 190 might be increased in response to adjustment of the front wheel driving force DFf and the rear wheel driving force DFr, which might make an occupant of the vehicle 190 feel a sense of discomfort. The second restriction amount is a value calculated in advance through an experiment and the like as a restriction amount such that an occupant of the vehicle 190 is less likely to feel a sense of discomfort if the amount of change in the driving force distribution ratio per unit time is equal to or smaller than the second restriction amount. In this way, the distribution setting unit 113 can change the driving force distribution ratio gradually from the state of the heavy emphasis on the front wheels to the state of the heavy emphasis on the rear wheels.

The driving force distribution ratio is gradually changed in the processing at Step S402, and thus the ratio of the rear wheel driving force DFr is gradually increased. For example, the rear wheel driving force DFr is gradually increased and the front wheel driving force DFf is gradually reduced. After causing the distribution setting unit 113 to set the driving force distribution ratio, the control apparatus 110 once terminates this processing routine.

On the other hand, in the processing at Step S401, if the target pitch angle θyT has not changed to a large size (S401: NO), the control apparatus 110 moves the processing to Step S403.

At Step S403, the control apparatus 110 causes the state judgment unit 112 to judge whether or not the target pitch angle θyT has changed from a large size to a small size. The state judgment unit 112 can judge whether or not the target pitch angle θyT has changed from a large size to a small size through processing which is common to the processing at Step S203 in FIG. 4. The state judgment unit 112 may alternatively acquire the result of the processing at Step S203 in FIG. 4. If the target pitch angle θyT has changed to a small size (S403: YES), the control apparatus 110 moves the processing to Step S404.

At Step S404, the control apparatus 110 causes the distribution setting unit 113 to set the driving force distribution ratio. In the processing at Step S404, since the target pitch angle θyT is small, the distribution setting unit 113 sets the driving force distribution ratio so that the driving force distribution ratio places a heavy emphasis on the front wheels according to the target pitch angle θyT. In addition, the control apparatus 110 causes the distribution setting unit 113 to restrict a change in the driving force distribution ratio. In other words, the distribution setting unit 113 changes the driving force distribution ratio from the state of the heavy emphasis on the rear wheels to the state of the heavy emphasis on the front wheels while restricting the change in the driving force distribution ratio. For example, the distribution setting unit 113 restricts the amount of change in the driving force distribution ratio by the same processing as the processing at Step S402. In this way, the distribution setting unit 113 can change the driving force distribution ratio gradually from the state of the heavy emphasis on the rear wheels to the state of the heavy emphasis on the front wheels.

The driving force distribution ratio is gradually changed in the processing at Step S404, and thus the ratio of the front wheel driving force DFf is gradually increased. For example, the front wheel driving force DFf is gradually increased and the rear wheel driving force DFr is gradually reduced. After causing the distribution setting unit 113 to set the driving force distribution ratio, the control apparatus 110 once terminates this processing routine.

On the other hand, in the processing at Step S403, if the target pitch angle θyT has not changed to a small size (S403: NO), the control apparatus 110 moves the processing to Step S405.

At Step S405, the control apparatus 110 causes the distribution setting unit 113 to set the driving force distribution ratio according to the target pitch angle θyT. The distribution setting unit 113 can calculate the driving force distribution ratio using the arithmetic operation map described in the processing at Step S305. After causing the distribution setting unit 113 to set the driving force distribution ratio, the control apparatus 110 once terminates this processing routine.

The control apparatus 110 may set the driving force distribution ratio to the basic driving force ratio once braking is over. The control apparatus 110 may delete the previous target pitch angle θyT0 once braking is over.

The operation and effect of this embodiment are described.

The control apparatus 110 can adjust the braking force distribution ratio during braking of the vehicle 190. The control apparatus 110 can exhibit the same effect as the control apparatus 10 in the first embodiment.

Further, in the control apparatus 110, if the target pitch angle θyT is small, the driving force distribution ratio is set so as to place a heavy emphasis on the front wheels (S305). In other words, the ratio of the front wheel driving force DFf is set larger. In the vehicle 190, its suspension geometry is set in such a way that, when the front wheel driving force DFf and the rear wheel driving force DFr have the same magnitude, the anti-squat force FdAS has a larger magnitude than the front wheel anti-lift force FdAL. Accordingly, by increasing the ratio of the front wheel driving force DFf, it is possible to reduce the anti-squat force FdAS while inhibiting the front wheel anti-lift force FdAL from being increased. This makes it easier to make the posture of the vehicle 190 closer to a horizontal posture even when the driving force is transmitted to the wheels during braking, thus making it possible to improve the vehicle 190's ride comfort.

Meanwhile, in the control apparatus 110, if the target pitch angle θyT is large, the driving force distribution ratio is set so as to place a heavy emphasis on the rear wheels (S307). In other words, the ratio of the rear wheel driving force DFr is set larger. In the vehicle 190, its suspension geometry is set in such a way that, when the front wheel driving force DFf and the rear wheel driving force DFr have the same magnitude, the anti-squat force FdAS has a larger magnitude than the front wheel anti-lift force FdAL. Accordingly, by increasing the ratio of the rear wheel driving force DFr, it is possible to make the anti-squat force FdAS of a larger magnitude act on the vehicle 190 while inhibiting the front wheel anti-lift force FdAL from being reduced. This makes it easier to depress the vehicle body front part 91F and bring the vehicle 190 into a forward tilt posture when the driving force is transmitted to the wheels during braking.

Besides, the control apparatus 110 restricts the change in the driving force distribution ratio if the driving force distribution ratio is different from the basic driving force ratio (S402 or S404). Thus, when the vehicle 190 transitions from the state of going straight to the turning state during braking of the vehicle 190, for example, the control apparatus can adjust the driving force distribution ratio so that the driving force distribution ratio is changed gradually to the state of the heavy emphasis on the rear wheels. Thereby, it is possible to bring the vehicle 190 into a forward tilt posture gradually while suppressing a sharp change in the pitch angle θy. Meanwhile, when the vehicle 190 transitions from the turning state to the state of going straight during braking of the vehicle 190, for example, the control apparatus can adjust the driving force distribution ratio so that the driving force distribution ratio is changed gradually to the state of the heavy emphasis on the front wheels. Thereby, it is possible to bring the vehicle 190 into a horizontal posture gradually while suppressing a sharp change in the pitch angle θy. According to the control apparatus 110, it is possible to suppress a sharp change in the pitch angle θy at the time of controlling the posture of the vehicle 190 even when the driving force is transmitted to the wheels during braking. Hence, according to the control apparatus 110, it is possible to reduce a sense of discomfort felt by an occupant of the vehicle.

<Correspondence>

In the first and second embodiments described above, the target pitch angle θyT corresponds to a target posture value. An area smaller than the first judgment value corresponds to a first area. An area equal to or larger than the second judgment value corresponds to a second area. The case in which the target pitch angle θyT has changed from a small size to a large size corresponds to "a case in which the target posture value is varied." The case in which the target pitch angle θyT has changed from a large size to a small size also corresponds to "the case in which the target posture value is varied."

Other Embodiments

The first embodiment or the second embodiment can be changed and embodied in the following manner. The first embodiment, the second embodiment, and the following modified examples can be embodied in combination with each other without technically conflicting therewith.

In the first and second embodiments described above, the braking force distribution ratio is changed gradually to the state of the heavy emphasis on the front wheels through the processing at Step S202 illustrated in FIG. 4. Instead, in the processing at Step S202, the braking force distribution ratio may be set so that the ratio of the front wheel braking force BFf is increased as compared to the braking force distribution ratio set at Step S105 within a range in which a heavier emphasis is placed on the rear wheels than the basic braking force ratio. In other words, the braking force distribution ratio may be set so as to place a heavier emphasis on the front wheels than the braking force distribution ratio set at Step S105 while keeping such a braking force distribution ratio that a heavier emphasis is placed on the rear wheels than the basic braking force ratio. In this case also, it is preferable that the amount of change by which the braking force distribution ratio is changed per unit time be set equal to or smaller than the first restriction amount.

In the processing at Step S204 illustrated in FIG. 4, the braking force distribution ratio may be set so that the ratio of the rear wheel braking force BFr is increased as compared to the braking force distribution ratio set at Step S107 within a range in which a heavier emphasis is placed on the front wheels than the basic braking force ratio. In other words, the braking force distribution ratio may be set so as to place a heavier emphasis on the rear wheels than the braking force distribution ratio set at Step S107 while keeping such a braking force distribution ratio that a heavier emphasis is placed on the front wheels than the basic braking force ratio. In this case also, it is preferable that the amount of change by which the braking force distribution ratio is changed per unit time be set equal to or smaller than the first restriction amount.

The first restriction amount may be set to "0". In this case, when the braking force distribution ratio is different from the basic braking force ratio, the braking force distribution ratio is set so as not to be changed if the target pitch angle θyT is varied. In other words, the braking force distribution ratio is kept since the braking force distribution ratio is adjusted during braking so as to differ from the basic braking force ratio.

For example, when a hydraulic pressure braking apparatus is employed as the braking apparatus for a vehicle, if the braking force distribution ratio is changed during braking, vibration generated by actuation of the braking actuator might be transmitted to the braking manipulation member. The vibration of the braking manipulation member might make a driver of the vehicle feel odd. According to the above modified example, it is possible to suppress such vibration of the braking manipulation member.

Note that, when a hydraulic pressure generator with a brake by wire system is employed, vibration generated by actuation of the braking actuator is not transmitted to the braking manipulation member. In this case, the first restriction amount does not necessarily have to be set to "0".

Meanwhile, assume that the vehicle is in automated driving control and the vehicle is going straight during braking. In this case, even when the vehicle transitions from the state of going straight to the turning state during braking, it is conceivably preferable that improvement of ride comfort be prioritized over improvement of operability during turning. By setting the first restriction amount to "0" in the processing at Step S202, it is possible to improve ride comfort during turning.

In the above second embodiment, the driving force distribution ratio is changed gradually to the state of the heavy emphasis on the rear wheels through the processing at Step S402 illustrated in FIG. 7. Instead, in the processing at Step S402, the driving force distribution ratio may be set so that the ratio of the rear wheel driving force DFr is increased as compared to the driving force distribution ratio set at Step S305 within a range in which a heavier emphasis is placed on the front wheels than the basic driving force ratio. In other words, the driving force distribution ratio may be set so as to place a heavier emphasis on the rear wheels than the driving force distribution ratio set at Step S305 while keeping such a driving force distribution ratio that a heavier emphasis is placed on the front wheels than the basic driving force ratio. In this case also, it is preferable that the amount of change by which the driving force distribution ratio is changed per unit time be set equal to or smaller than the second restriction amount.

In the processing at Step S404 illustrated in FIG. 7, the driving force distribution ratio may be set so that the ratio of the front wheel driving force DFf is increased as compared to the driving force distribution ratio set at Step S307 within a range in which a heavier emphasis is placed on the rear wheels than the basic driving force ratio. In other words, the driving force distribution ratio may be set so as to place a heavier emphasis on the front wheels than the driving force distribution ratio set at Step S307 while keeping such a driving force distribution ratio that a heavier emphasis is placed on the rear wheels than the basic driving force ratio. In this case also, it is preferable that the amount of change by which the driving force distribution ratio is changed per unit time be set equal to or smaller than the second restriction amount.

The second restriction amount may be set to "0". In this case, when the driving force distribution ratio is different from the basic driving force ratio, the driving force distribution ratio is set so as not to be changed if the target pitch angle θyT is varied. In other words, the driving force distribution ratio is kept since the driving force distribution ratio is adjusted during braking so as to differ from the basic driving force ratio.

The target posture value indicating the target posture of the vehicle is not limited to the target pitch angle θyT. For example, the target posture value may be a target value for the roll angle. By judging the size of the target value for the roll angle, it is possible to determine whether the vehicle is going straight or turning.

In the first and second embodiments described above, the hydraulic pressure braking apparatus is exemplified as the braking apparatus 80. The braking apparatus 80 is not limited to the hydraulic pressure braking apparatus and may be a friction braking apparatus. A regenerative braking apparatus that is configured to apply a regenerative braking force to the wheels may also be employed as the braking apparatus 80. In this case, the basic braking force ratio is set to a value calculated in advance through an experiment and the like. The regenerative braking apparatus is actuated according to the basic braking force ratio if the braking force distribution ratio is not adjusted. For example, the basic braking force ratio is set to a value that enables a desired pitching movement during braking of the vehicle. The basic braking force ratio in the case of employing the regenerative braking apparatus may be set to a ratio different from the basic braking force ratio in the case of employing the friction braking apparatus. The basic braking force ratio in the case of employing the regenerative braking apparatus may be set to the same ratio as the basic braking force ratio in the case of employing the friction braking apparatus.

A disc brake is exemplified as the braking mechanism 84. The braking mechanism is not limited to the disc brake. For example, a drum brake including a drum as a rotary body and a shoe as a friction member may be employed.

The control apparatus 10 or the control apparatus 110 may perform control over a vehicle in which a suspension geometry different from the suspension geometry of the vehicle 90 or 190 is set. The control apparatus 10 or the control apparatus 110 may perform control over a vehicle in which a suspension geometry is set in such a way that, when the front wheel braking force BFf and the rear wheel braking force BFr have the same magnitude, the anti-dive force FbAD has a larger magnitude than the rear wheel anti-lift force FbAL. Hereinbelow, an example of the case in which the control apparatus performs control over this vehicle is described.

In this case, at Step S105 in FIG. 3, the control apparatus 10 or the control apparatus 110 alternatively executes the processing described as the processing at Step S107. In other words, if the target pitch angle θyT is small, the braking force distribution ratio is set so as to place a heavy emphasis on the front wheels. Thereby, when the target pitch angle θyT is small, it is possible to make the anti-dive force FbAD of a larger magnitude act on the vehicle and thus suppress the pitching moment M. In other words, this makes it easier to bring the vehicle into a horizontal posture.

In addition, at Step S107 in FIG. 3, the control apparatus 10 or the control apparatus 110 alternatively executes the processing described as the processing at Step S105. In other words, if the target pitch angle θyT is large, the braking force distribution ratio is set so as to place a heavy emphasis on the rear wheels. Thereby, when the target pitch angle θyT is large, it is possible to reduce the anti-dive force FbAD while inhibiting the rear wheel anti-lift force FbAL from being increased. Thus, it is possible to reduce a force to work in the direction to suppress the pitching moment M, that is, it is possible to depress the vehicle body front part and bring the vehicle into a forward tilt posture.

Further, at Step S202 in FIG. 4, the control apparatus 10 or the control apparatus 110 alternatively executes the processing described as the processing at Step S204. Furthermore, at Step S204 in FIG. 4, the control apparatus 10 or the control apparatus 110 alternatively executes the processing described as the processing at Step S202. Thereby, it is possible to restrict a change in the braking force distribution ratio at the time of controlling the posture of the vehicle, that is, it is possible to suppress a sharp change in the pitch angle θy.

As described above, it is possible to exhibit the same effect as in the first and second embodiments described above even when the control apparatus performs control over a vehicle in which a suspension geometry different from the suspension geometry of the vehicle 90 or 190 is set.

The control apparatus 110 may perform control over a vehicle in which a suspension geometry is set in such a way that, when the front wheel driving force DFf and the rear wheel driving force DFr have the same magnitude, the front wheel anti-lift force FdAL has a larger magnitude than the anti-squat force FdAS. Hereinbelow, an example of the case in which the control apparatus performs control over this vehicle is described.

In this case, at Step S305 in FIG. 6, the control apparatus 110 alternatively executes the processing described as the processing at Step S307. In other words, if the target pitch angle θyT is small, the driving force distribution ratio is set so as to place a heavy emphasis on the rear wheels. Thereby, when the target pitch angle θyT is small, it is possible to reduce the front wheel anti-lift force FdAL while inhibiting the anti-squat force FdAS from being increased. This makes it easier to bring the vehicle into a horizontal posture.

In addition, at Step S307 in FIG. 6, the control apparatus 110 alternatively executes the processing described as the processing at Step S305. In other words, if the target pitch angle θyT is large, the driving force distribution ratio is set so as to place a heavy emphasis on the front wheels. Thereby, when the target pitch angle θyT is large, it is possible to make the front wheel anti-lift force FdAL of a larger magnitude act on the vehicle while inhibiting the anti-squat force FdAS from being reduced, that is, it is possible to depress the vehicle body front part and bring the vehicle into a forward tilt posture.

Further, at Step S402 in FIG. 7, the control apparatus 110 alternatively executes the processing described as the processing at Step S404. Furthermore, at Step S404 in FIG. 7, the control apparatus 110 alternatively executes the processing described as the processing at Step S402. Thereby, it is possible to restrict a change in the driving force distribution ratio at the time of controlling the posture of the vehicle, that is, it is possible to suppress a sharp change in the pitch angle θy.

As described above, it is possible to exhibit the same effect as in the second embodiment described above even when the control apparatus performs control over a vehicle in which a suspension geometry different from the suspension geometry of the vehicle 190 is set.

In the above second embodiment, the four-wheel drive vehicle 190 equipped with the first motor generator 171F and the second motor generator 171R is exemplified. The control apparatus 110 may perform control over a four-wheel drive vehicle equipped with an internal combustion engine as its power source.

An example of the four-wheel drive vehicle equipped with an internal combustion engine as its power source includes: a front differential gear; and a rear differential gear. This vehicle also includes: a propeller shaft that couples the front differential gear and the rear differential gear to each other; and an electronically controlled coupling device. The control apparatus 110 can adjust the front wheel driving force DFf and the rear wheel driving force DFr by controlling the electronically controlled coupling device.

A control apparatus other than the control apparatus 10 may have the function of controlling the driving apparatus 71. A control apparatus other than the control apparatus 110 may have the function of controlling the first motor generator 171F and the second motor generator 171R constituting the driving apparatus.

The configuration in which the distribution setting unit 13 sets the braking force distribution ratio and the driving force distribution ratio is exemplified. The control apparatus 10 may include: a braking distribution setting unit that is configured to set the braking force distribution ratio; and a driving distribution setting unit that is configured to set the driving force distribution ratio. A control apparatus other than the control apparatus may include the driving distribution setting unit. Likewise, the control apparatus 110 may include: a braking distribution setting unit that is configured to set the braking force distribution ratio; and a driving distribution setting unit that is configured to set the driving force distribution ratio. A control apparatus other than the control apparatus 110 may include the driving distribution setting unit.

The control apparatus 10 and the control apparatus 110 may have any one of configurations (a) to (c) below. (a) The control apparatus includes at least one processor that is configured to execute various kinds of processing according to computer programs. The processor includes a CPU and a memory such as a RAM and a ROM. The memory stores therein program codes or commands configured so as to cause the CPU to execute the processing. The memory, i.e., a computer-readable medium includes any available medium accessible by general-purpose or dedicated computers. (b) The control apparatus includes at least one dedicated hardware circuit that is configured to execute various kinds of processing. Examples of the dedicated hardware circuit include an integrated circuit for a specific purpose, i.e., an ASIC (Application Specific Integrated Circuit) or an FPGA (Field Programmable Gate Array), for example. (c) The control apparatus includes: a processor that is configured to execute a part of various kinds of processing according to computer programs; and a dedicated hardware circuit that is configured to execute the remaining part of the various kinds of processing.

The technical idea that can be understood from the above embodiments and modified examples is described.

1. A control method for a vehicle for controlling a vehicle that is capable of adjusting a braking force distribution ratio which is a ratio for distributing a braking force to be applied on wheels at the time of braking a vehicle between a braking force to be applied on front wheels and a braking force to be applied on rear wheels, in which the method causes a control apparatus for a vehicle to execute:

a calculation process of calculating, as a target posture value, a value indicating a target posture of the vehicle; and a distribution setting process of changing the braking force distribution ratio from a basic braking force ratio during braking of the vehicle so that a posture of the vehicle follows a posture indicated by the target posture value, the basic braking force ratio being a value of the braking force distribution ratio obtained when no control for adjusting the braking force distribution ratio is performed, and the distribution setting process includes a restriction process of setting the amount of change, by which the braking force distribution ratio is changed per unit time, equal to or smaller than a restriction amount if the target posture value is varied when the braking force distribution ratio is different from the basic braking force ratio.

2. A control apparatus for a vehicle including:

a state judgment unit that is configured to judge whether or not a vehicle is going straight; and a distribution setting unit that is configured to set a braking force distribution ratio so as to inhibit the vehicle from being tilted forward if the vehicle is going straight during braking of the vehicle.

REFERENCE SIGNS LIST

10: Control apparatus
11: Traveling state detection unit
12: State judgment unit
13: Distribution setting unit
21: Posture detection sensor
22: Brake sensor
23: Accelerator sensor
61: Braking manipulation member
71: Driving apparatus
73F: Front wheel axle
73R: Rear wheel axle
80: Braking apparatus
84: Braking mechanism
90: Vehicle
91: Vehicle body
91F: Vehicle body front part
91R: Vehicle body rear part
110: Control apparatus
111: Traveling state detection unit
112: State judgment unit
113: Distribution setting unit
171F: First motor generator
171R: Second motor generator
190: Vehicle

The invention claimed is:

1. A control apparatus for a vehicle that is employed in a vehicle capable of adjusting a braking force distribution ratio which is a ratio for distributing a braking force to be applied on wheels at a time of braking the vehicle between a braking force to be applied on front wheels and a braking force to be applied on rear wheels, comprising:

a calculator that is configured to calculate, as a target posture value, a value indicating a target posture of the vehicle;

a distribution setting unit that is configured to change the braking force distribution ratio from a basic braking force ratio during braking of the vehicle so that a posture of the vehicle follows a posture indicated by the target posture value, the basic braking force ratio being a value of the braking force distribution ratio stored as a reference value for adjusting the braking force distribution ratio; and a state judgment unit that is configured to judge whether or not the target posture value is varied, wherein if the target posture value is varied when the braking force distribution ratio is different from the basic braking force ratio, the distribution setting unit sets an amount of change, by which the braking force distribution ratio is changed per unit time, equal to or smaller than a restriction amount, and the state judgment unit divides an area of the target posture value into a first area of the target posture value, which indicates a target posture at the time when the vehicle is going straight, and a second area of the target posture value, which indicates a target posture at the time when the vehicle is turning, as areas of the target posture value for judging whether the target posture value is varied, and judges that the target posture value is varied if the target posture value moves from one of the first area and the second area to the other.

2. The control apparatus for the vehicle according to claim 1, wherein the distribution setting unit sets the restriction amount to "0".

3. The control apparatus for the vehicle according to claim 2, wherein
the restriction amount is a first restriction amount,
the vehicle is capable of distributing a driving force of the vehicle to the front wheels and to the rear wheels, and
while a ratio for distributing the driving force of the vehicle between a driving force to be applied on the front wheels and a driving force to be applied on the rear wheels is set as a driving force distribution ratio, the distribution setting unit
changes, when the driving force is applied on the wheels, the driving force distribution ratio from a basic driving force ratio so that the posture of the vehicle follows the posture indicated by the target posture value, the basic driving force ratio being a value of the driving force distribution ratio stored as a reference value for adjusting the driving force distribution ratio, and
if the target posture value is varied when the driving force distribution ratio is different from the basic driving force ratio, the distribution setting unit sets the amount of change, by which the driving force distribution ratio is changed per unit time, equal to or smaller than a second restriction amount.

4. The control apparatus for the vehicle according to claim 3, wherein the distribution setting unit sets the second restriction amount to "0".

* * * * *